(12) United States Patent
Fukunaga et al.

(10) Patent No.: US 11,302,344 B2
(45) Date of Patent: Apr. 12, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Daisuke Fukunaga, Tokyo (JP); Yoshiki Tanaka, Kanagawa (JP); Hisahiro Suganuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 15/733,127

(22) PCT Filed: Aug. 31, 2018

(86) PCT No.: PCT/JP2018/032466
§ 371 (c)(1),
(2) Date: May 21, 2020

(87) PCT Pub. No.: WO2019/106902
PCT Pub. Date: Jun. 6, 2019

(65) Prior Publication Data
US 2020/0402528 A1    Dec. 24, 2020

(30) Foreign Application Priority Data
Nov. 30, 2017  (JP) .............................. JP2017-230802

(51) Int. Cl.
*H04W 28/14* (2009.01)
*G10L 21/055* (2013.01)
(Continued)

(52) U.S. Cl.
CPC ........ *G10L 21/055* (2013.01); *G10L 15/1815* (2013.01); *G10L 15/22* (2013.01);
(Continued)

(58) Field of Classification Search
CPC ..... H04W 28/14; G10L 21/04; H04L 65/4069
See application file for complete search history.

(56) References Cited

U.S. PATENT DOCUMENTS

| 8,185,611 B2* | 5/2012 | Price | H04L 65/4084 |
| | | | 709/219 |
| 2006/0077994 A1* | 4/2006 | Spindola | H04J 3/0632 |
| | | | 370/412 |

(Continued)

FOREIGN PATENT DOCUMENTS

| JP | 09-081174 A | 3/1997 |
| JP | 2002-271391 A | 9/2002 |

(Continued)

OTHER PUBLICATIONS

International Search Report and Written Opinion of PCT Application No. PCT/JP2018/032466, dated Oct. 16, 2018, 07 pages of ISRWO.

*Primary Examiner* — Feng-Tzer Tzeng
(74) *Attorney, Agent, or Firm* — Chip Law Group

(57) ABSTRACT

An information processing apparatus including an audio buffer unit, a reproduction time calculation unit, a position decision unit; and an insertion unit. The audio buffer unit retains first audio data that have not been reproduced in the first audio data received from another apparatus via a transmission path. The reproduction time calculation unit calculates a reproduction time of second audio data on the basis of at least any of a state of the first audio data retained in the audio buffer unit or a state of the transmission path. The second audio data are to be inserted and reproduced while the first audio data are being reproduced. The position decision unit decides an insertion position of the second audio data in the first audio data. The insertion unit controls (Continued)

a process of inserting the second audio data at the insertion position in the first audio data.

16 Claims, 17 Drawing Sheets

(51) Int. Cl.
     *G10L 15/18*     (2013.01)
     *G10L 15/22*     (2006.01)
     *G10L 25/78*     (2013.01)
     *G10L 21/04*     (2013.01)
     *H04L 65/61*     (2022.01)

(52) U.S. Cl.
     CPC .............. *G10L 25/78* (2013.01); *G10L 21/04* (2013.01); *H04L 65/4069* (2013.01); *H04W 28/14* (2013.01)

(56) References Cited

U.S. PATENT DOCUMENTS

2008/0022005 A1\* 1/2008 Wu .......................... H04L 65/80
                                                                                                    709/231
2009/0083047 A1\* 3/2009 Lindahl ................ G11B 27/038
                                                                                                    704/504

FOREIGN PATENT DOCUMENTS

| JP | 2012-205066 A | 10/2012 |
| JP | 2017-083713 A | 5/2017 |

\* cited by examiner

[FIG. 1]
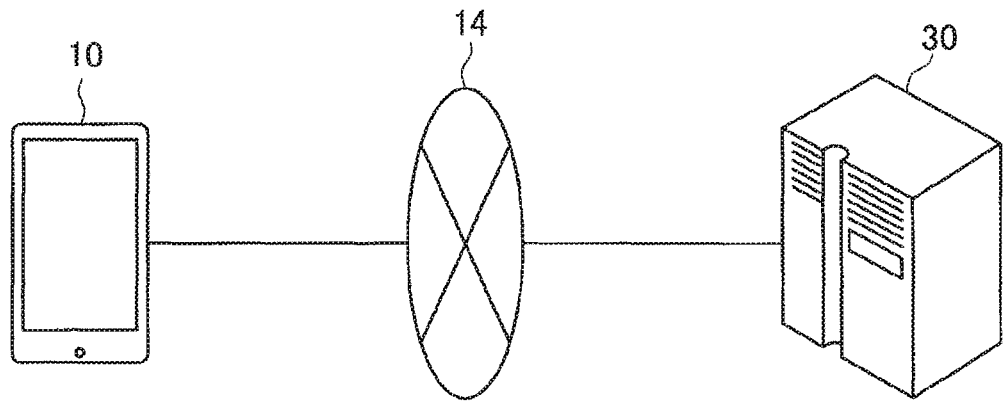
[FIG. 2]
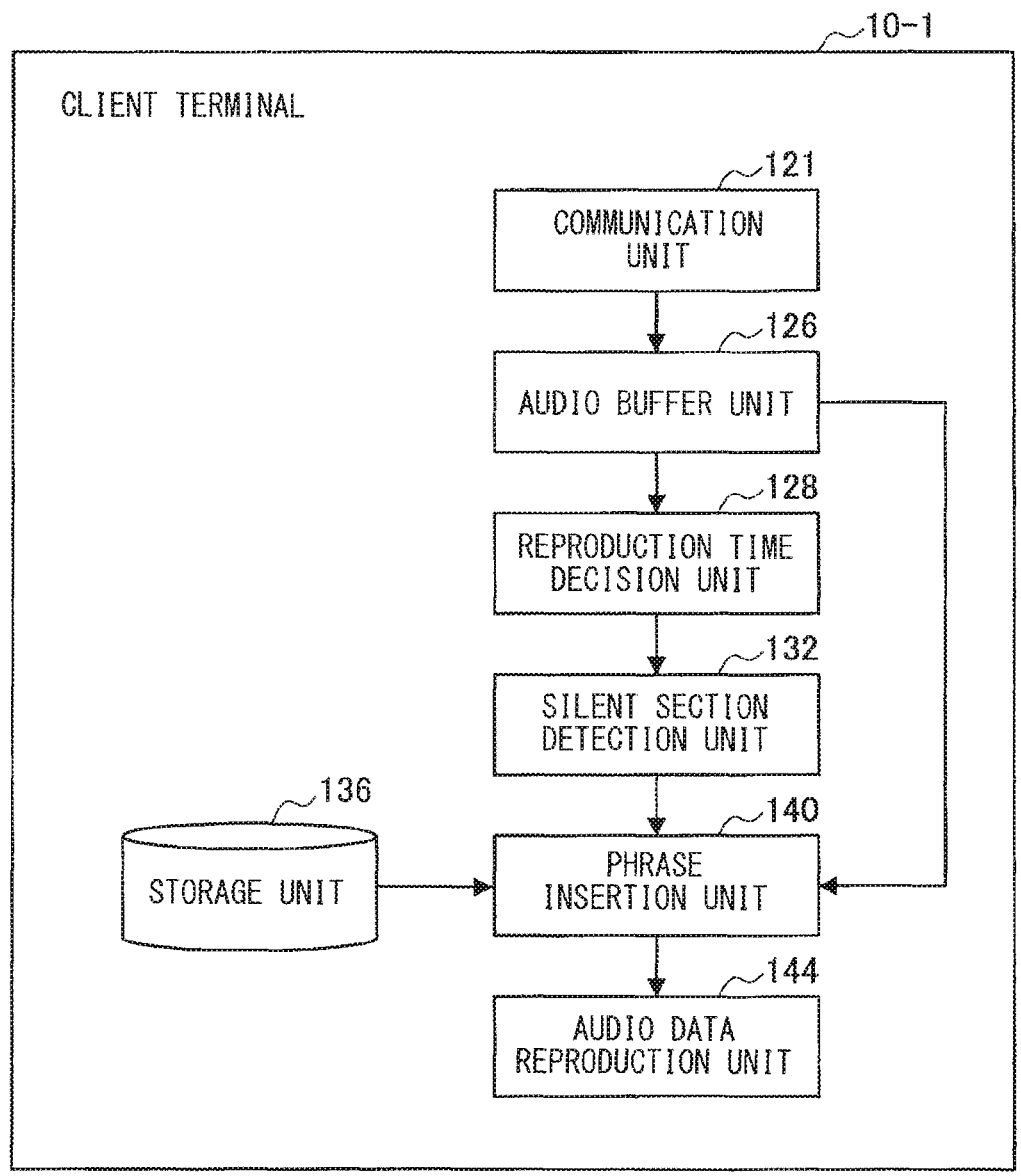

[FIG. 3]
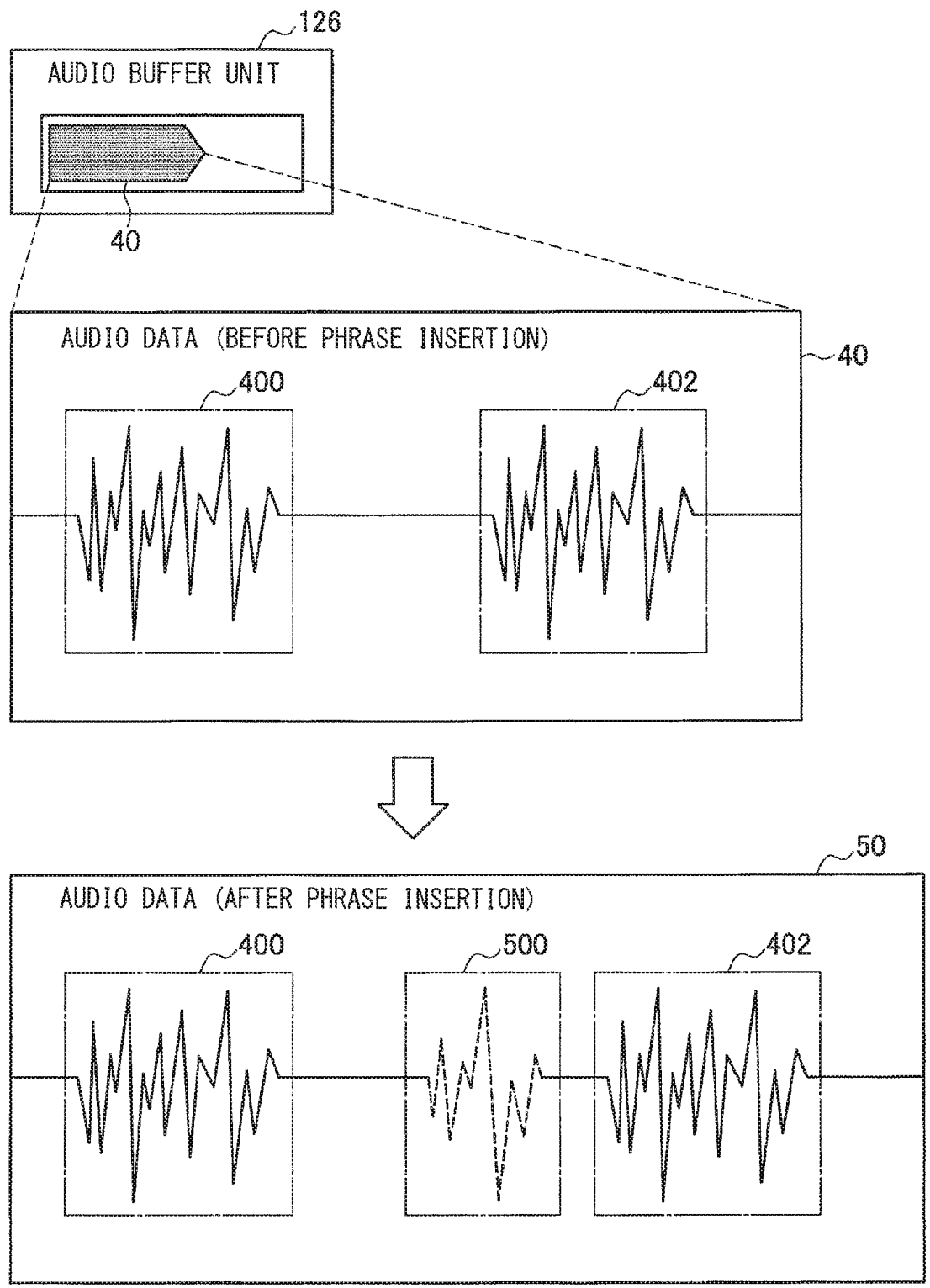

[FIG. 4]
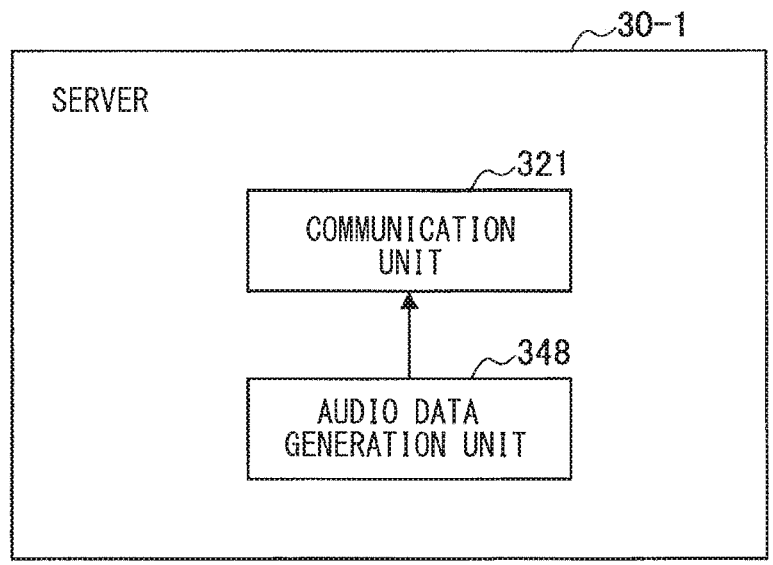
[FIG. 5]
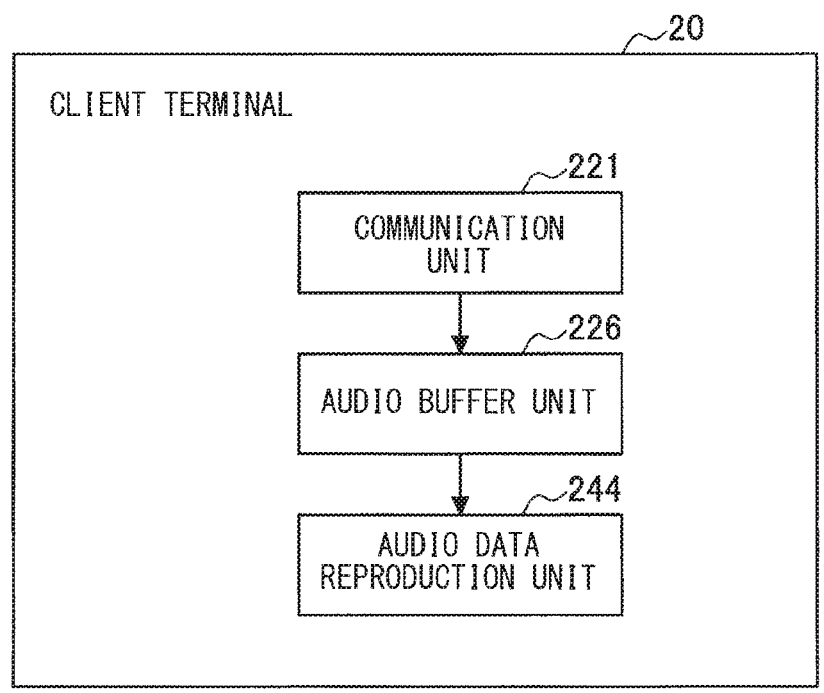

[FIG. 6]
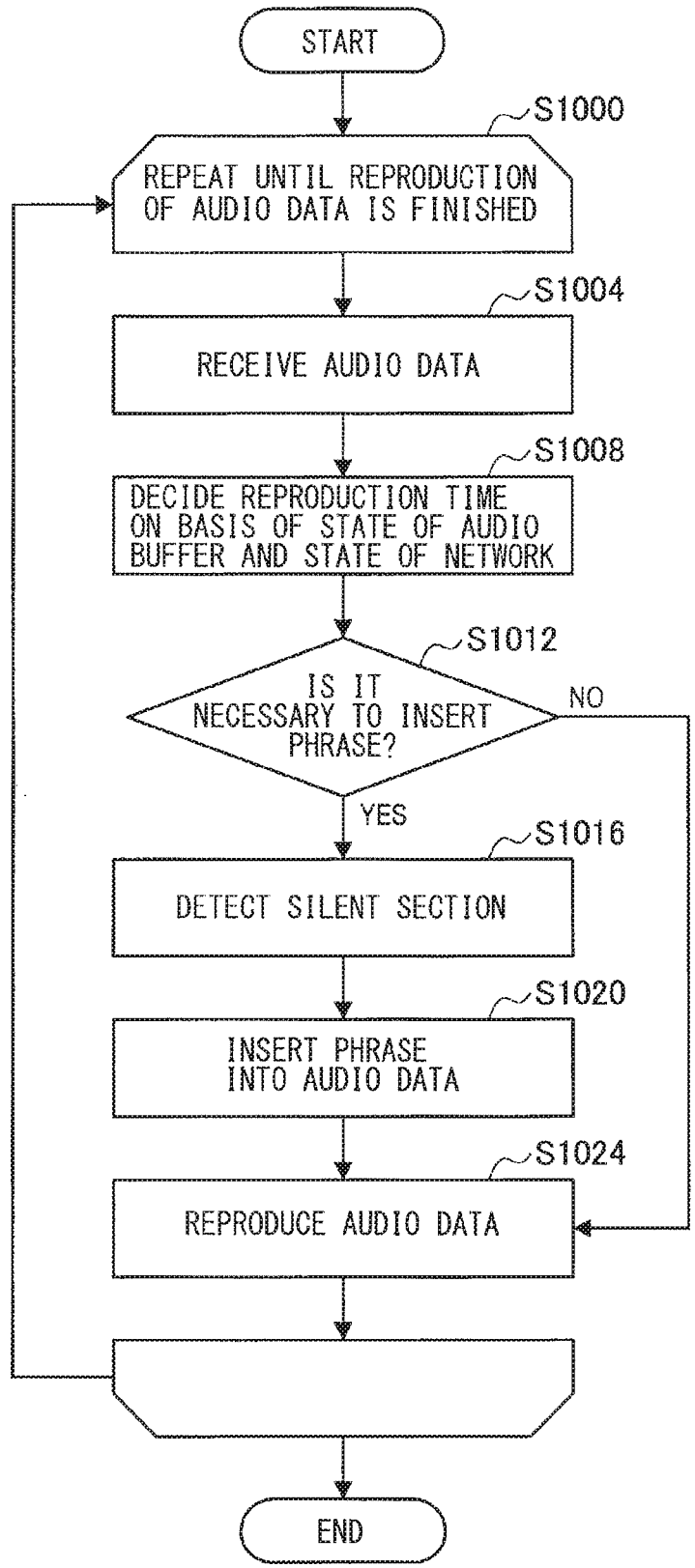

[FIG. 7]
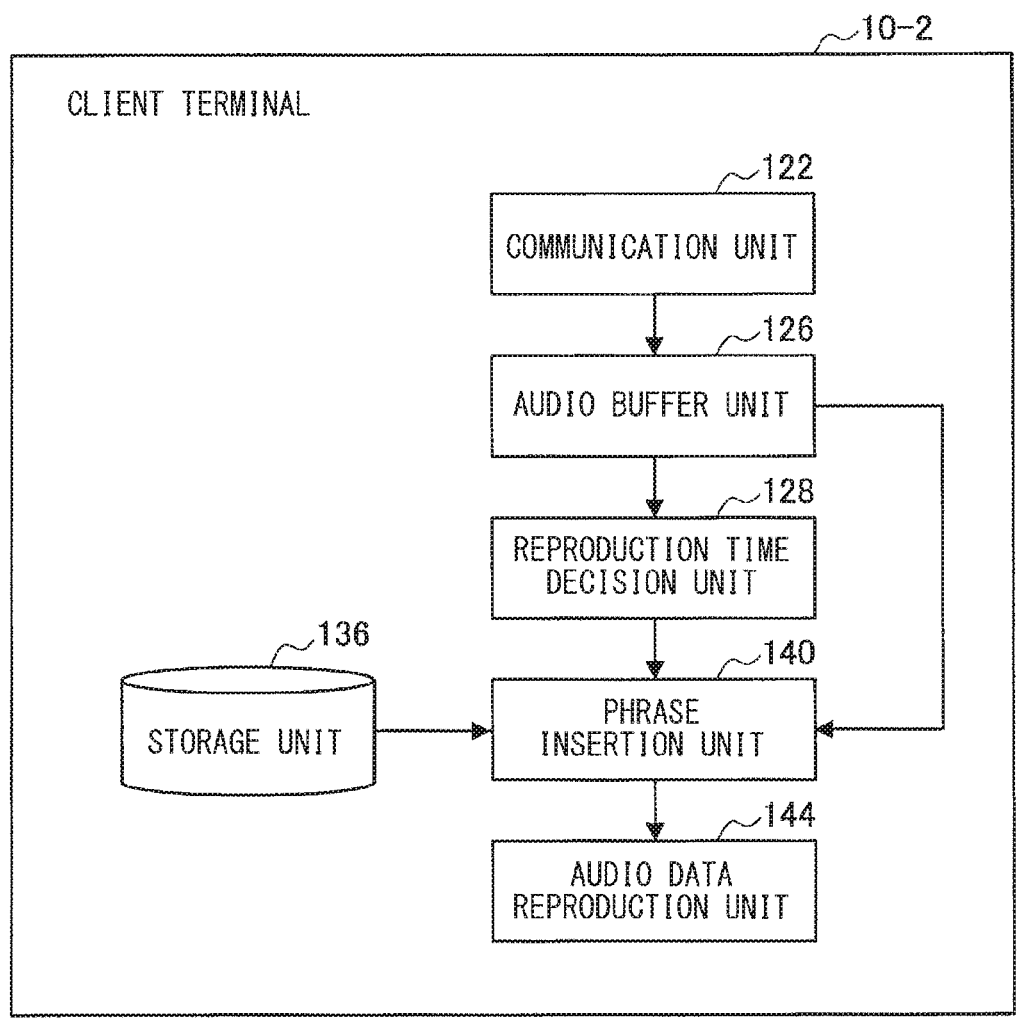

[FIG. 8]
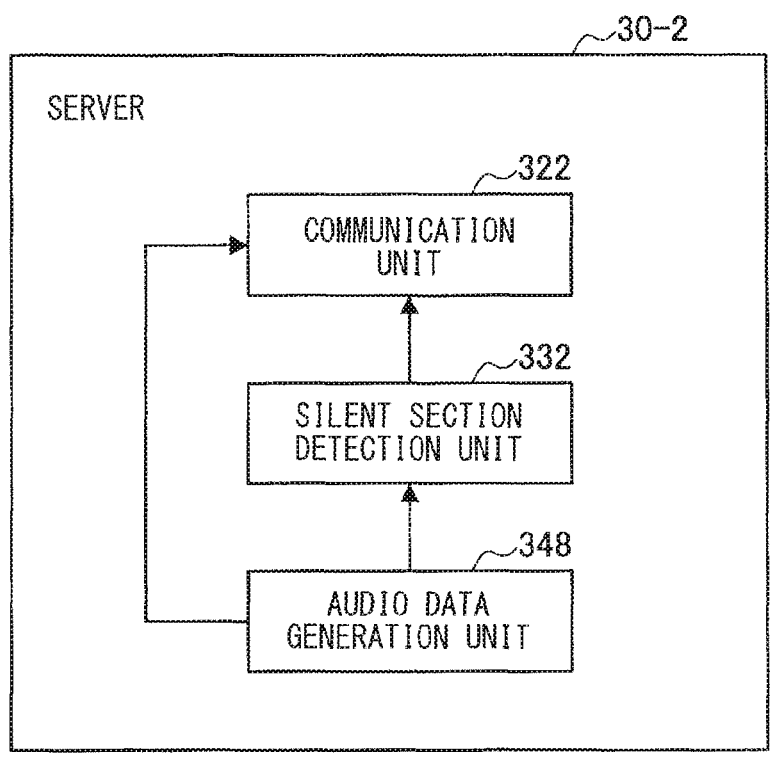

[FIG. 9]
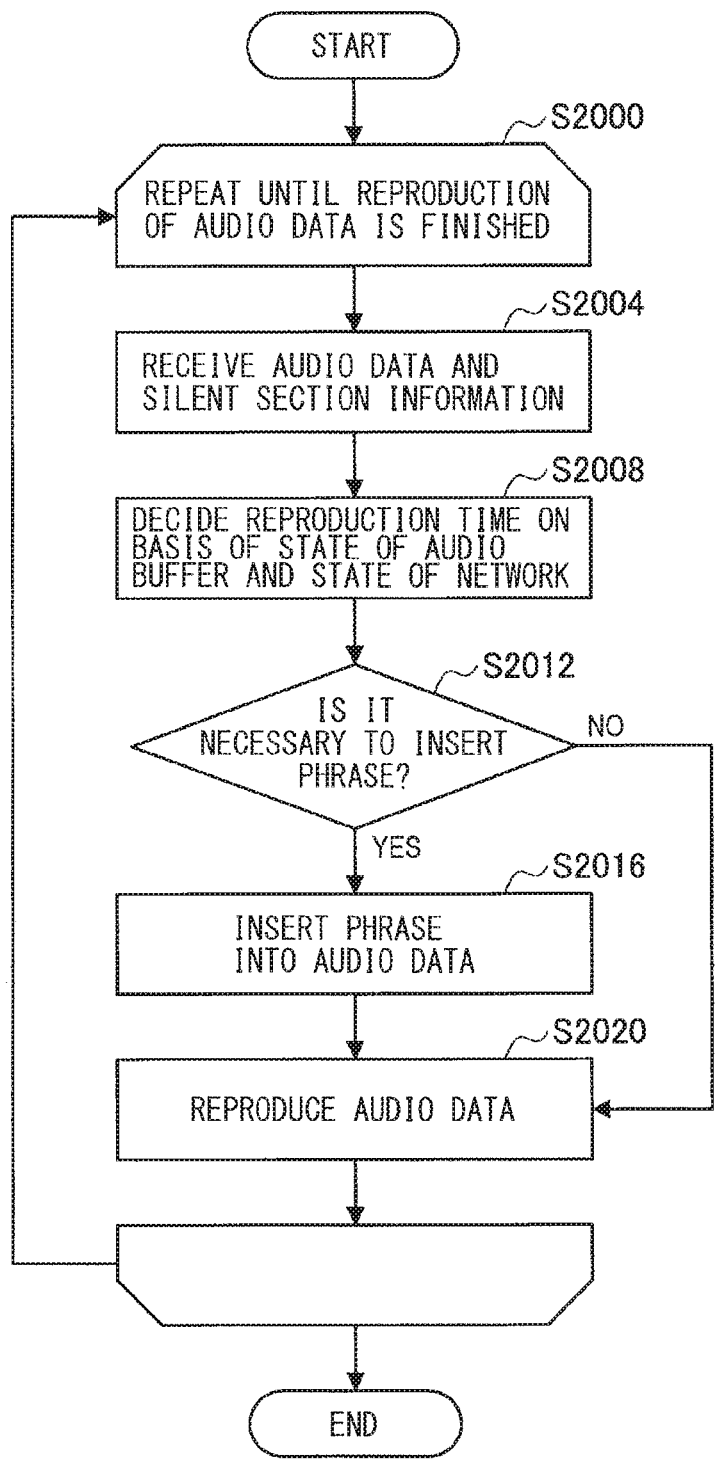

[FIG. 10]
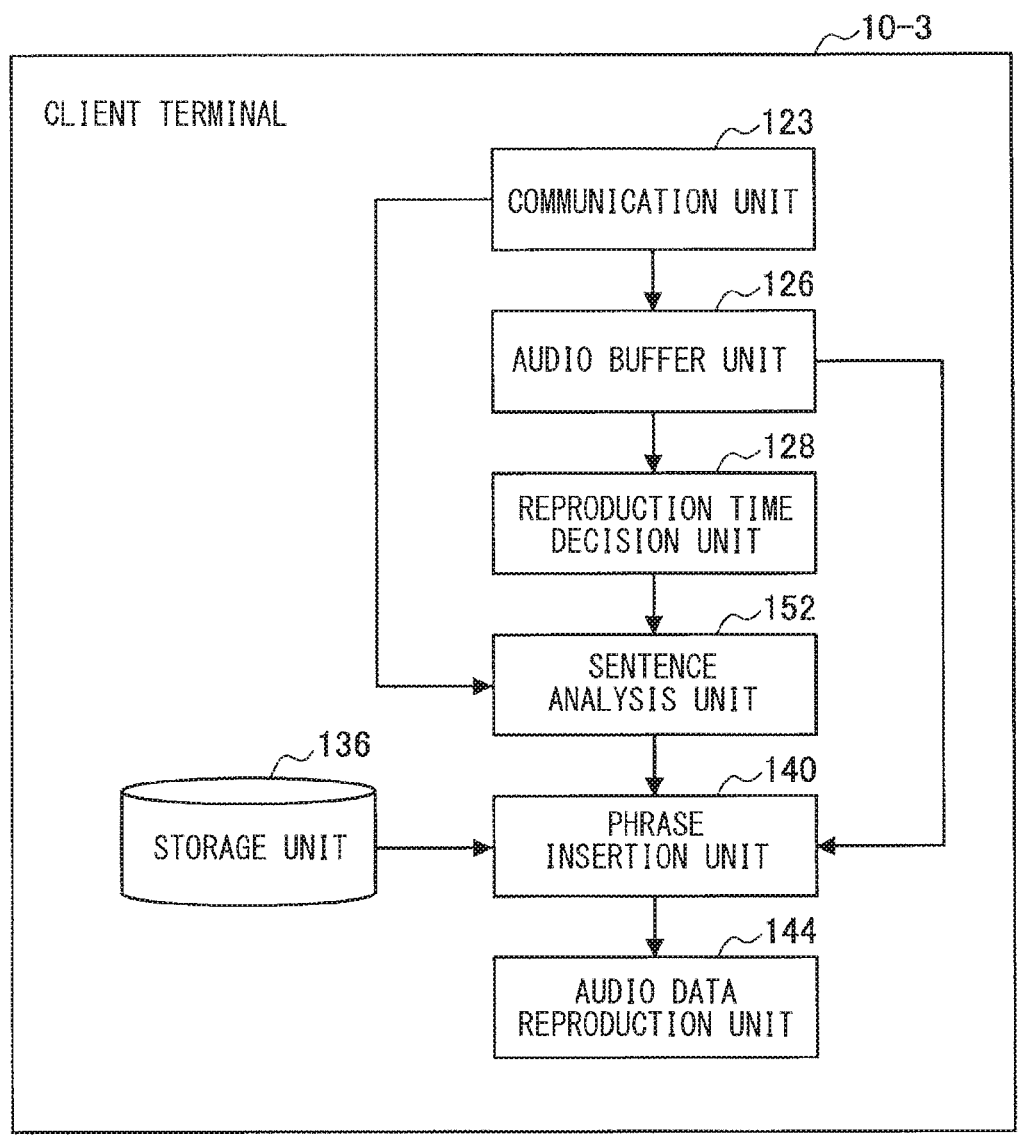

[ FIG. 11 ]
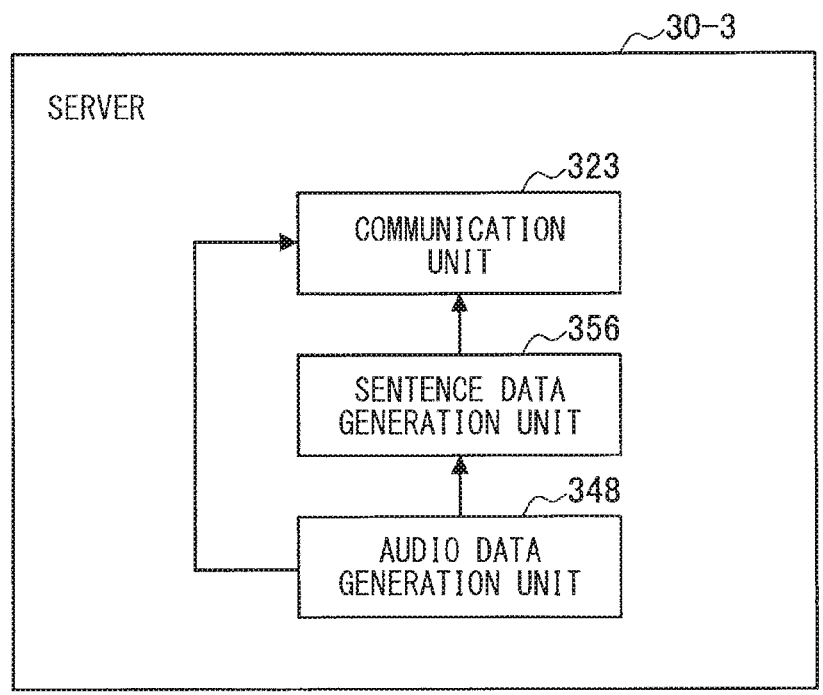

[ FIG. 12 ]
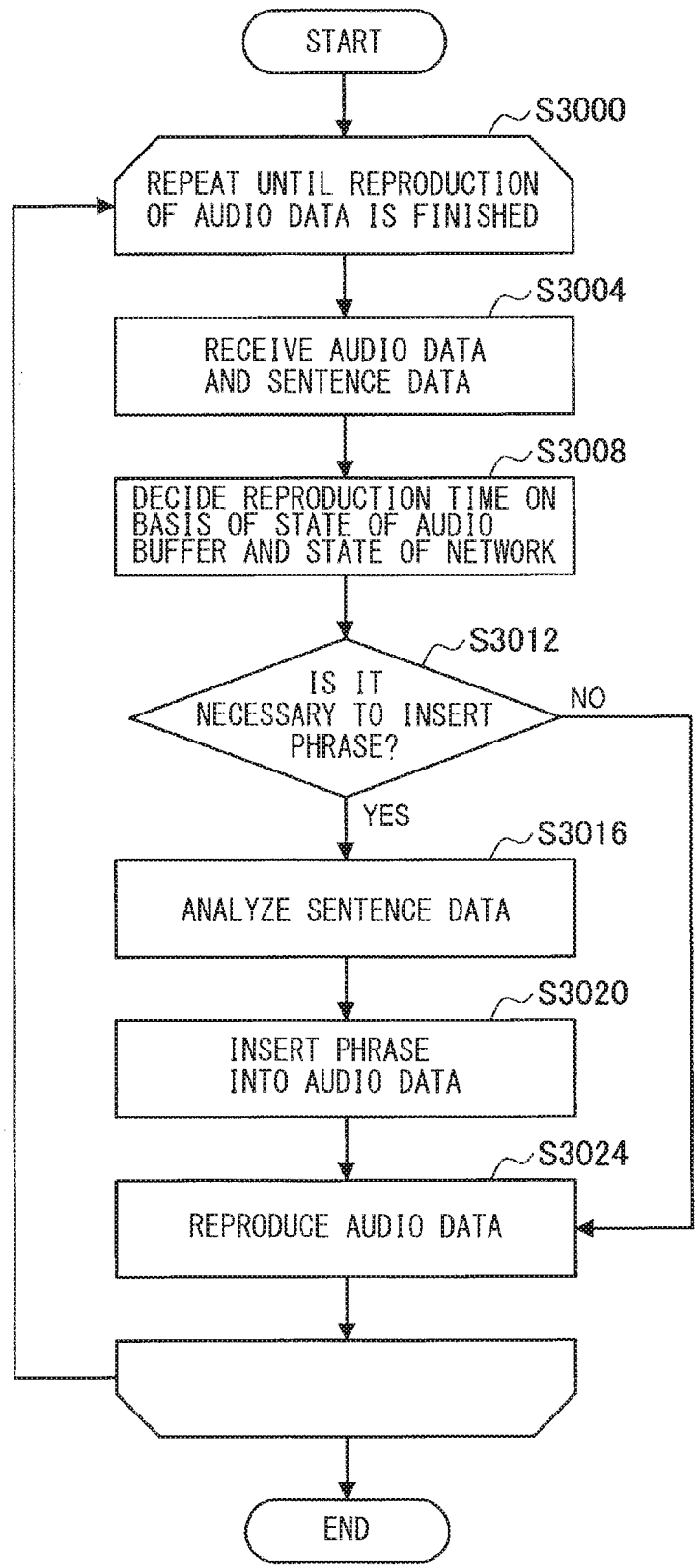

[ FIG. 13 ]
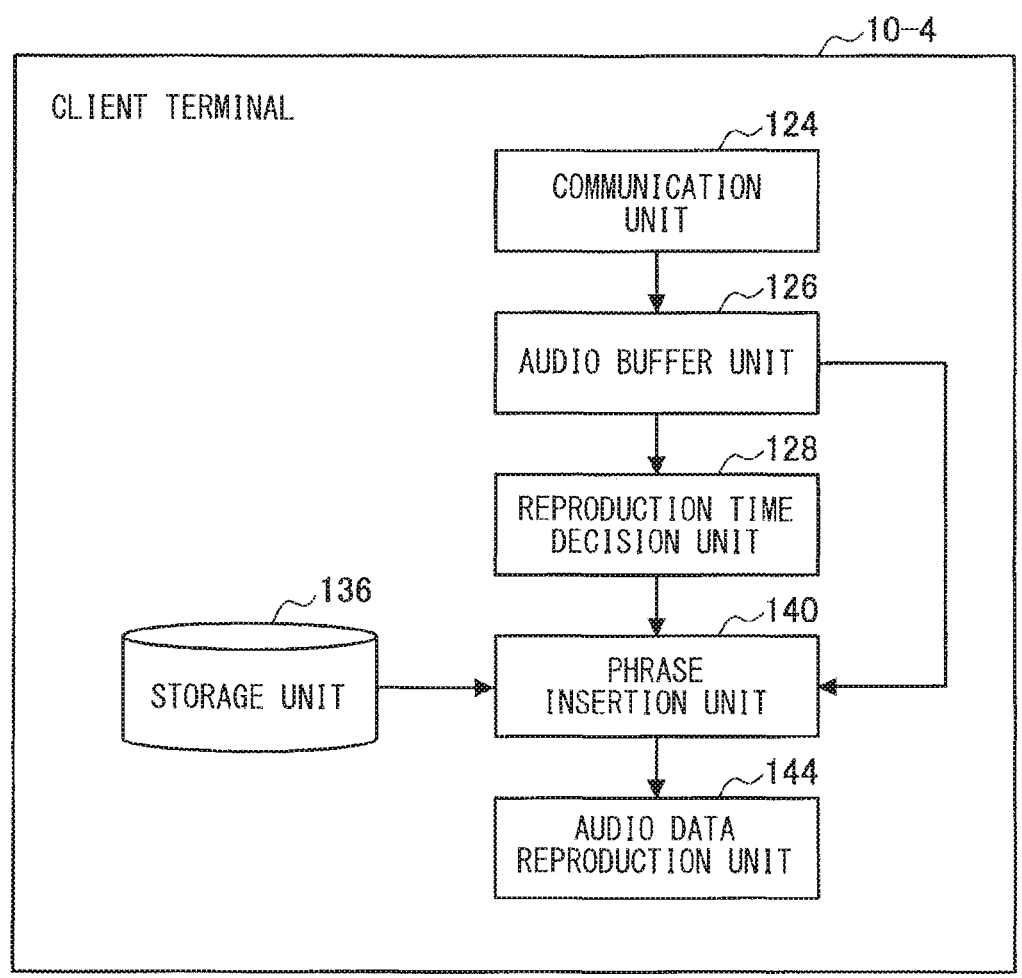

[ FIG. 14 ]
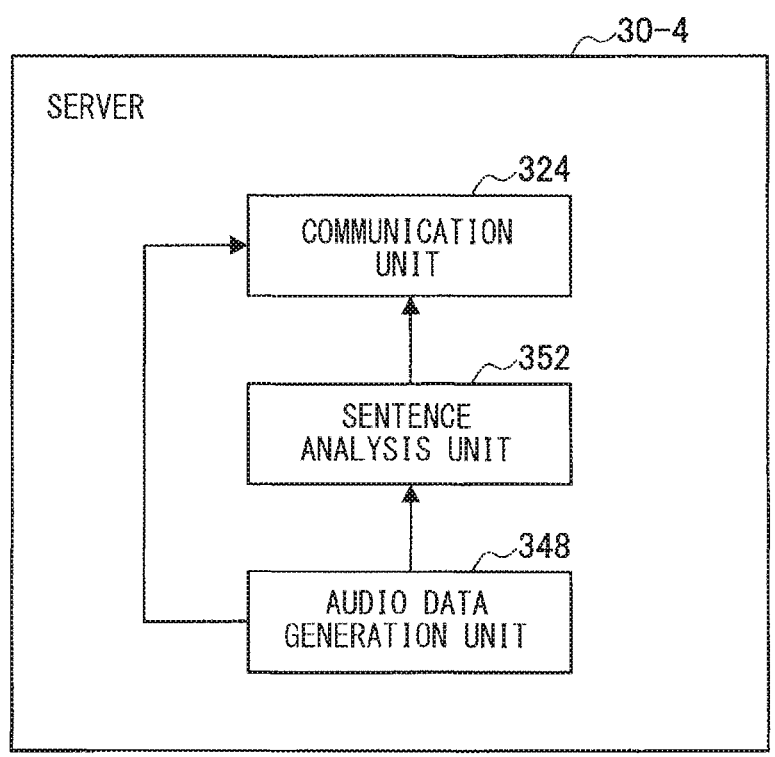

[FIG. 15]
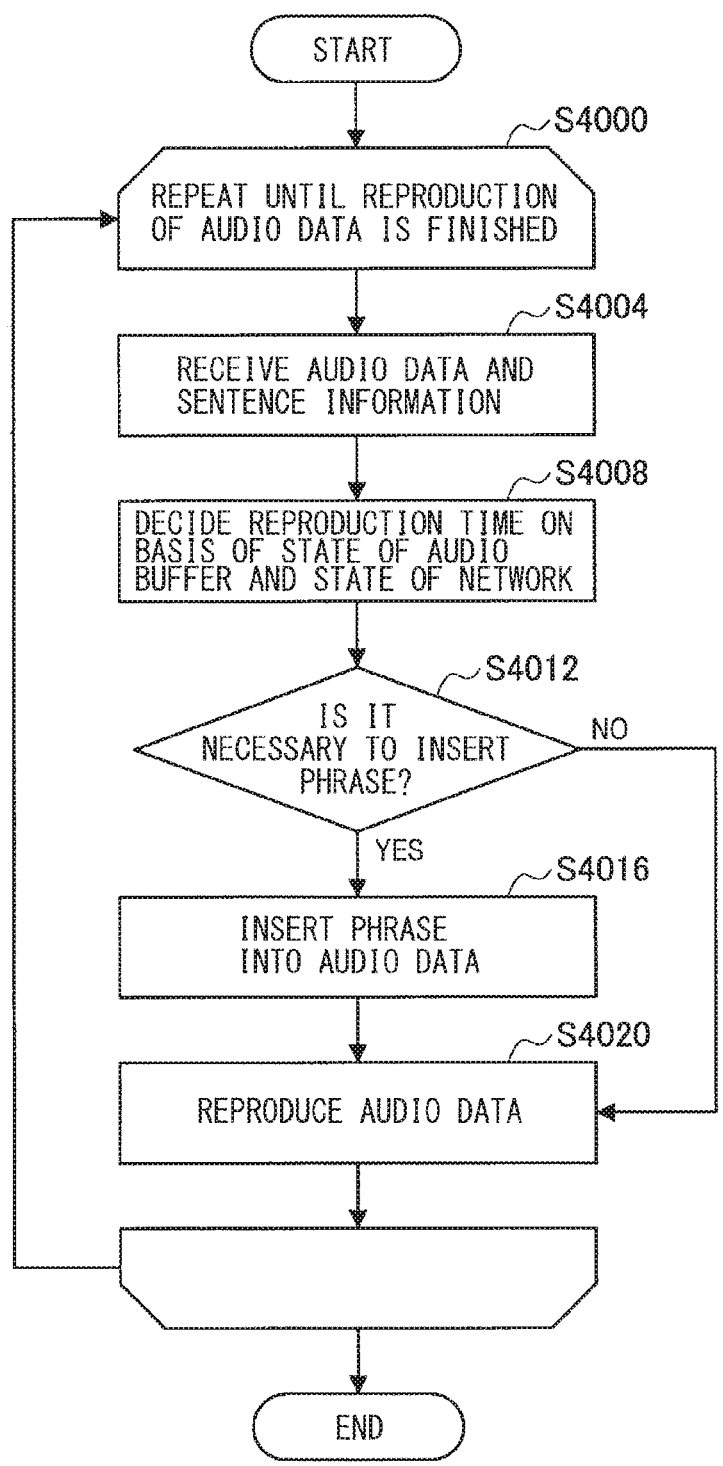

[FIG. 16]
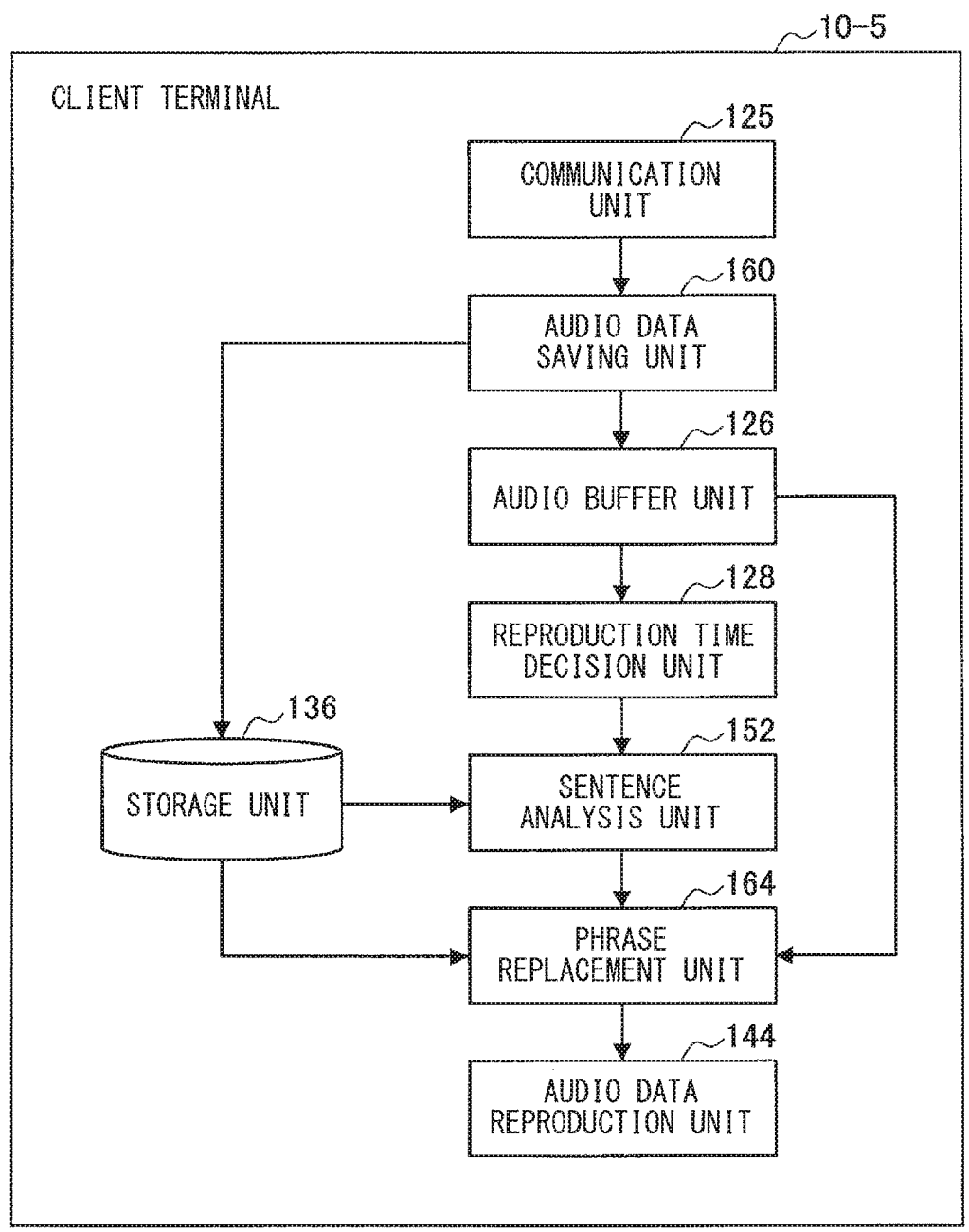

[FIG. 17]
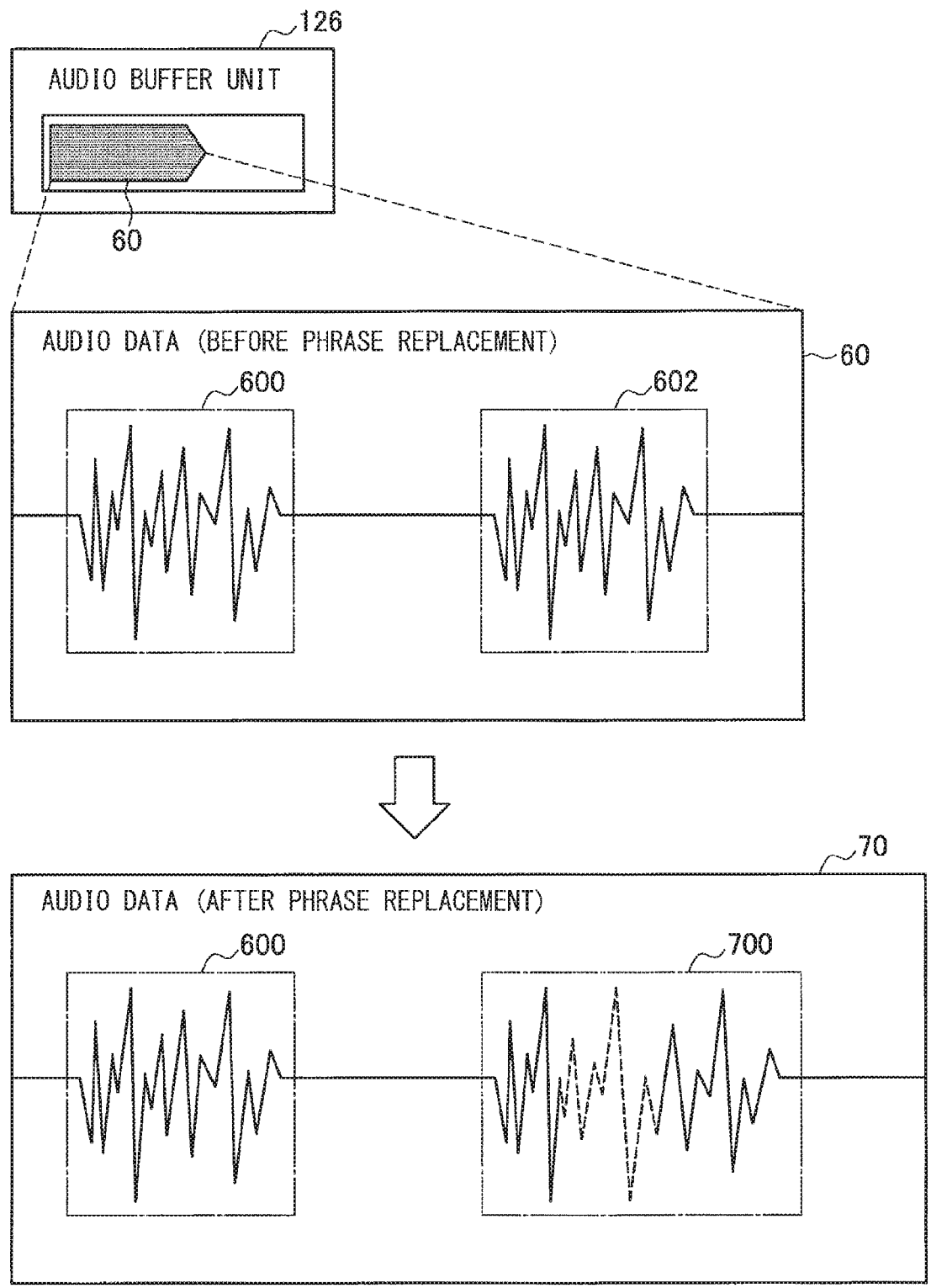

[ FIG. 18 ]
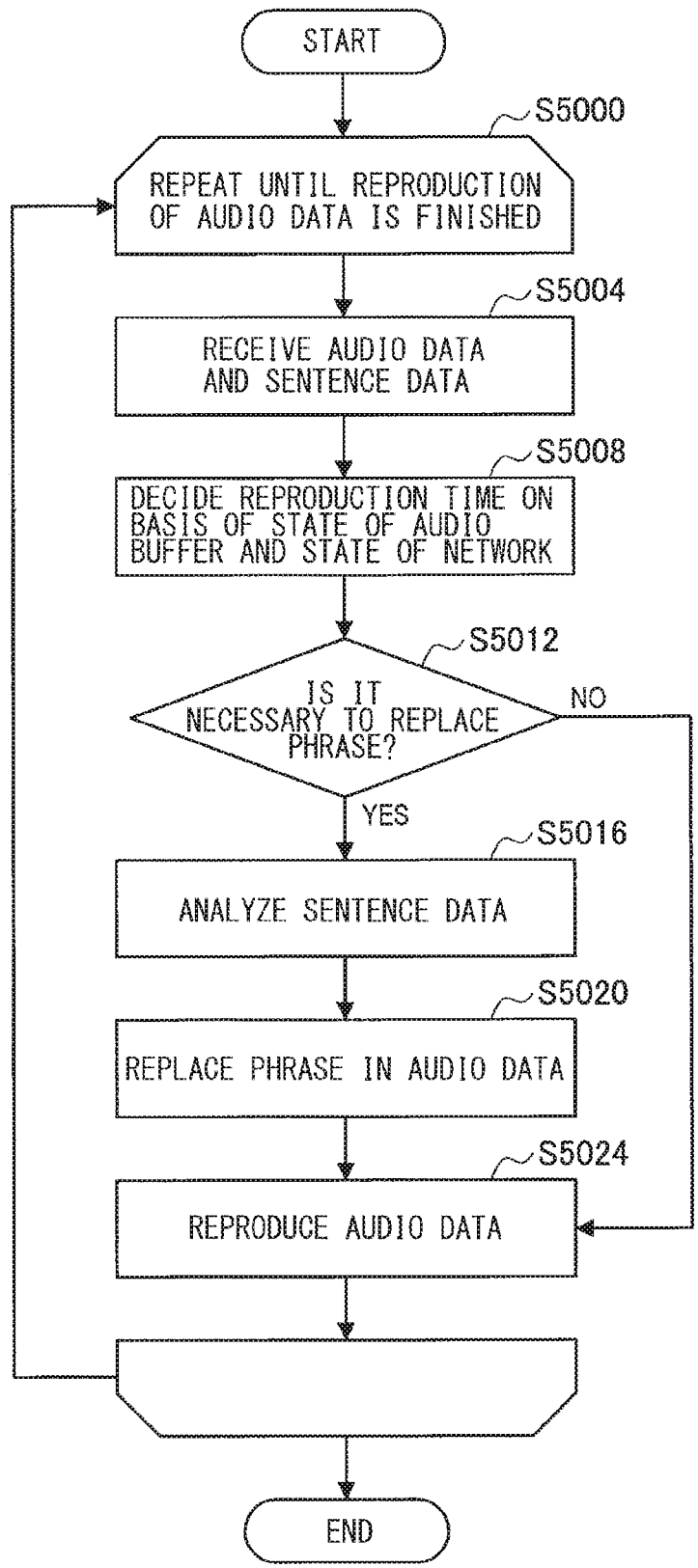

[FIG. 19]
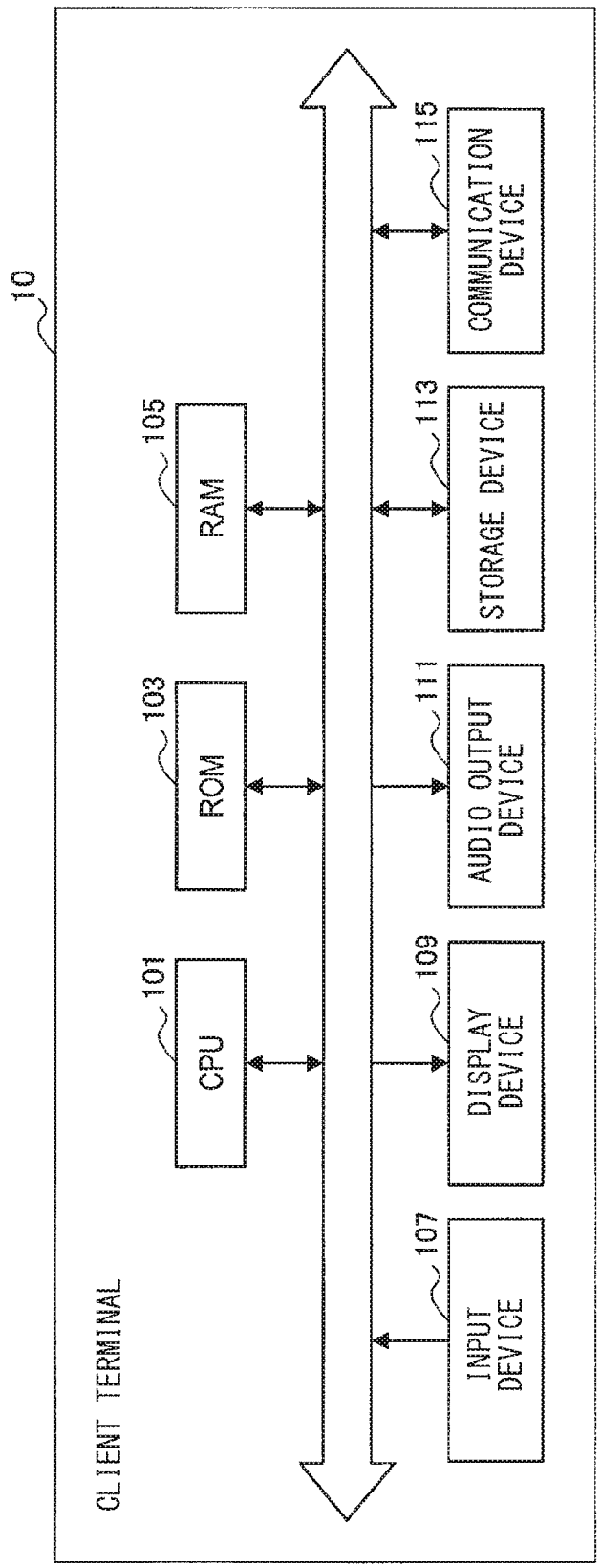

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2018/032466 filed on Aug. 31, 2018, which claims priority benefit of Japanese Patent Application No. JP 2017-230802 filed in the Japan Patent Office on Nov. 30, 2017. Each of the above-referenced applications is hereby incorporated herein by reference in its entirety.

TECHNICAL FIELD

The present disclosure relates to an information processing apparatus, an information processing method, and a program.

BACKGROUND ART

Various techniques have been conventionally proposed for reproducing audio data received from servers via networks. For example, a server transmits audio data generated on the server side to a client terminal via a network. An existing technique then causes the client terminal to receive all the audio data transmitted from the server side, and start to reproduce the audio data thereafter. However, in a case where the received audio data have a long reproduction time, it takes time before the client terminal starts to reproduce the audio data.

PTL 1 below discloses a technique for causing a client terminal consecutively reproduces audio data while receiving the audio data in connection with this. Specifically, a server transmits audio data generated on the server side to a client terminal via a network. The client terminal then temporarily accumulates the received audio data in a buffer, and extracts and consecutively reproduces the audio data accumulated in the buffer while receiving audio data.

CITATION LIST

Patent Literature

PTL 1: Japanese Unexamined Patent Application Publication No. 2012-205066

SUMMARY OF THE INVENTION

Problems to be Solved by the Invention

In the above-described technique, however, the unstable state of the network causes the audio data receiving speed to be lower than the audio data reproducing speed, and all the audio data accumulated in the audio buffer are reproduced (that is also referred to as audio buffer depletion), which sometimes interrupts the reproduction of the audio data.

Accordingly, the present disclosure proposes a novel and improved information processing apparatus, information processing method, and program each of which makes it possible to stably secure time for receiving audio data when reproducing audio data while receiving audio data.

Means for Solving the Problems

According to the present disclosure, there is provided an information processing apparatus including: an audio buffer unit; a reproduction time calculation unit; a position decision unit; and an insertion unit. The audio buffer unit retains first audio data that have not been reproduced in the first audio data received from another apparatus via a transmission path. The reproduction time calculation unit calculates a reproduction time of second audio data on the basis of at least any of a state of the first audio data retained in the audio buffer unit or a state of the transmission path. The second audio data are to be inserted and reproduced while the first audio data are being reproduced. The position decision unit decides an insertion position of the second audio data in the first audio data. The insertion unit controls a process of inserting the second audio data at the insertion position in the first audio data. The insertion position is decided by the position decision unit. The second audio data correspond to the reproduction time calculated by the reproduction time calculation unit.

In addition, according to the present disclosure, there is provided an information processing method that is executed by a processor. The information processing method includes: retaining first audio data that have not been reproduced in the first audio data received from another apparatus via a transmission path; calculating a reproduction time of second audio data on the basis of at least any of a state of the first audio data retained in an audio buffer unit or a state of the transmission path; deciding an insertion position of the second audio data in the first audio data; and controlling a process of inserting the second audio data at the insertion position in the first audio data. The second audio data are to be inserted and reproduced while the first audio data are being reproduced. The insertion position is decided by a position decision unit. The second audio data correspond to the reproduction time calculated by a reproduction time calculation unit.

According to the present disclosure, a program for causing a computer to function as an audio buffer unit, a reproduction time calculation unit, a position decision unit, and an insertion unit. The audio buffer unit retains first audio data that have not been reproduced in the first audio data received from another apparatus via a transmission path. The reproduction time calculation unit calculates a reproduction time of second audio data on the basis of at least any of a state of the first audio data retained in the audio buffer unit or a state of the transmission path. The second audio data are to be inserted and reproduced while the first audio data are being reproduced. The position decision unit decides an insertion position of the second audio data in the first audio data. The insertion unit controls a process of inserting the second audio data at the insertion position in the first audio data. The insertion position is decided by the position decision unit. The second audio data correspond to the reproduction time calculated by the reproduction time calculation unit.

Effects of the Invention

According to the present disclosure as described above, it is possible to secure time for receiving audio data when reproducing audio data while receiving audio data.

It is to be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 1 is an explanatory diagram illustrating an overview of an information processing system according to an embodiment of the present disclosure.

FIG. 2 is a block diagram illustrating a configuration example of a client terminal according to a first embodiment of the present disclosure.

FIG. 3 is an explanatory diagram illustrating an example of insertion of a phrase into audio data.

FIG. 4 is a block diagram illustrating a configuration example of a server according to the embodiment.

FIG. 5 is a block diagram illustrating a configuration example of a client terminal according to a comparative example.

FIG. 6 is a flowchart illustrating a phrase insertion process according to the first embodiment of the present disclosure.

FIG. 7 is a block diagram illustrating a configuration example of a client terminal according to a second embodiment of the present disclosure.

FIG. 8 is a block diagram illustrating a configuration example of a server according to the second embodiment of the present disclosure.

FIG. 9 is a flowchart illustrating a phrase insertion process according to the second embodiment of the present disclosure.

FIG. 10 is a block diagram illustrating a configuration example of a client terminal according to a third embodiment of the present disclosure.

FIG. 11 is a block diagram illustrating a configuration example of a server according to the third embodiment of the present disclosure.

FIG. 12 is a flowchart illustrating a phrase insertion process according to the third embodiment of the present disclosure FIG. 13 is a block diagram illustrating a configuration example of a client terminal according to a fourth embodiment of the present disclosure.

FIG. 14 is a block diagram illustrating a configuration example of a server according to the fourth embodiment of the present disclosure.

FIG. 15 is a flowchart illustrating a phrase insertion process according to the fourth embodiment of the present disclosure FIG. 16 is a block diagram illustrating a configuration example of a client terminal according to a fifth embodiment of the present disclosure.

FIG. 17 is an explanatory diagram illustrating a replacement example of a phrase in audio data.

FIG. 18 is a flowchart illustrating a phrase replacement process according to the fifth embodiment of the present disclosure.

FIG. 19 is a block diagram illustrating a hardware configuration example of a client terminal according to an embodiment of the present disclosure

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

It is to be noted that description is given in the following order.

1. Overview of the Present Disclosure
2. First Embodiment
3. Second Embodiment
4. Third Embodiment
5. Fourth Embodiment
6. Fifth Embodiment
7. Modification Examples
8. Application Examples
9. Hardware Configuration
10. Conclusion

1. OVERVIEW OF THE PRESENT DISCLOSURE

The following describes an information processing system according to an embodiment of the present disclosure by using, as examples, a server that generates audio data and the like, and a client terminal that inserts a phrase into the audio data and the like received from the server on the basis of the audio data. The following describes an overview of an information processing system according to an embodiment of the present disclosure with reference to FIG. 1.

FIG. 1 is an explanatory diagram illustrating an overview of an information processing system according to an embodiment of the present disclosure. As illustrated in FIG. 1, a client terminal 10 is coupled to a server 30 via a network 14 (transmission path).

(1) Client Terminal 10

The client terminal 10 is an information processing apparatus that reproduces audio data (first audio data) received from the server 30. For example, the client terminal 10 receives audio data from the server 30 via the network 14, and reproduces the received audio data to notify a user of the contents of the audio data.

In addition, the client terminal 10 has a function of inserting a phrase into audio data. It is to be noted that the following also refers to a phrase to be inserted into audio data as insertion phrase (second audio data). The insertion phrase is a phrase that is inserted into audio data to prevent the reproduction of the audio data from being interrupted. In addition, an insertion process in the embodiment of the present disclosure also includes a process of deleting a certain phrase and inserting another phrase at the position of the deleted phrase in addition to a process of inserting a phrase between a phrase and a phrase. The following also refers to the above-described process of deleting a phrase and inserting another phrase at the position of the deleted phrase as replacement.

In addition, the client terminal 10 has a function of calculating the reproduction time of an insertion phrase necessary to prevent the reproduction of audio data from being interrupted. For example, on the basis of at least any of the state of audio data being reproduced or the state of the network 14, the client terminal 10 calculates the reproduction time of an insertion phrase to be inserted for reproduction into the audio data being reproduced.

In addition, the client terminal 10 may have a function of deciding an insertion position at which an insertion phrase is inserted. For example, the client terminal 10 analyzes audio data received from the server 30 to decide an insertion position at which an insertion phrase is inserted. In addition, for example, the client terminal 10 may receive the sentence data (text data) corresponding to audio data from the server 30, and analyzes the sentence data to decide an insertion position at which an insertion phrase is inserted. It is to be noted that it may be not the client terminal 10, but the server 30 that has the above-described function of deciding an insertion position at which an insertion phrase is inserted.

It is to be noted that the client terminal 10 is typically achieved as a physically independent apparatus. Additionally, the function of the client terminal 10 may be implemented as an application, and installed in a terminal apparatus such as a smartphone, a tablet terminal, PC, a wearable terminal, or an agent device. That is, the client terminal 10 may be achieved as any terminal apparatus.

(2) Server 30

The server 30 is an information processing apparatus that provides audio data and information regarding the audio data to the client terminal 10, and has a function of generating audio data to be provided to the client terminal 10. For example, the server 30 generates audio data, and transmits the generated audio data to the client terminal 10 via the network 14.

In addition, the server 30 may have a function of generating sentence data to be provided to the client terminal 10. For example, the server 30 analyzes audio data generated by the server 30 to convert the audio data into text and generate sentence data. It is to be noted that an example has been described in which the server 30 generates audio data, and then generates sentence data in the above-described example. The server 30 may also, however, generate sentence data earlier, and analyze the generated sentence data to generate audio data.

In addition, the server 30 may have a function of deciding an insertion position at which an insertion phrase is inserted into audio data. For example, the server 30 analyzes audio data to decide an insertion position at which an insertion phrase is inserted. It is to be noted that the following also refers to information regarding an insertion position at which an insertion phrase is inserted that is decided by analyzing audio data as silent section information. The silent section information is information regarding a silent section included in audio data, for example. In addition, the server 30 may analyze sentence data to decide an insertion position at which an insertion phrase is inserted. It is to be noted that the following also refers to information regarding an insertion position at which an insertion phrase is inserted that is decided by analyzing sentence data as sentence information. The sentence information is information regarding a phrasal delimitation in sentence data, for example.

(3) Network 14

The network 14 is a wired or wireless transmission path of information. The network 14 includes, for example, the Internet, a cellular communication network, wireless LAN (Local Area Network), Bluetooth (registered trademark), LAN, a telephone line, or the like. In the network 14, information may be bidirectionally transmitted or unidirectionally transmitted like radio broadcasting.

The overview of the information processing system according to the embodiment of the present disclosure has been described above with reference to FIG. 1. Next, the information processing system according to the first embodiment of the present disclosure is described.

2. FIRST EMBODIMENT

In an information processing system according to a first embodiment of the present disclosure, the server 30 generates audio data and transmits the generated audio data to the client terminal 10. The client terminal 10 that receives the audio data then performs processes of determining whether to insert a phrase into the audio data or not, deciding the insertion position of a phrase to be inserted into the audio data, and inserting a phrase at the insertion position.

<2.1. Configuration Example>

(2.1.1. Client Terminal 10-1)

The following describes a configuration example of a client terminal 10-1 according to the first embodiment of the present disclosure with reference to FIGS. 2 and 3. As illustrated in FIG. 2, the client terminal 10-1 includes a communication unit 121, an audio buffer unit 126, a reproduction time decision unit 128, a silent section detection unit 132, a storage unit 136, a phrase insertion unit 140, and an audio data reproduction unit 144.

(1) Communication Unit 121

The communication unit 121 is an interface for coupling the client terminal 10-1 and a server 30-1, and has a function for the client terminal 10-1 to perform information communication with the server 30-1. For example, the communication unit 121 receives audio data generated by the server 30-1 in communication with the server 30-1. The communication unit 121 then outputs the received audio data to the audio buffer unit 126.

(2) Audio Buffer Unit 126

The audio buffer unit 126 has a function of temporarily retaining audio data. For example, upon receiving audio data from the communication unit 121, the audio buffer unit 126 retains the received audio data. The audio data retained in the audio buffer unit 126 is then subjected to the process of inserting a phrase described below, and finally reproduced by the audio data reproduction unit 144. It is to be noted that audio data reproduced by the audio data reproduction unit 144 are subtracted from audio data retained in the audio buffer unit 126. That is, the audio buffer unit 126 retains audio data that have not been reproduced in audio data received from the server 30. In addition, the audio buffer unit 126 transmits audio data to the reproduction time decision unit 128 and the phrase insertion unit 140 for the process of inserting a phrase.

(3) Reproduction Time Decision Unit 128

The reproduction time decision unit 128 has a function of calculating the reproduction time of an insertion phrase. For example, on the basis of at least any of the state of audio data received from the audio buffer unit 126 or the state of the network 14, the reproduction time decision unit 128 calculates the reproduction time of an insertion phrase. The state of audio data includes at least any of the amount of audio data retained in the audio buffer unit 126, the increase or decrease amount of audio data, or the like. In addition, the state of the network 14 includes at least any of the coupling state of the network 14, the communication speed of the network 14, or the like. The amount of audio data is audio data that are retained in the audio buffer unit 126, but have not been reproduced. The amount of audio data is increased by receiving audio data from the communication unit 121, and decreased by reproducing audio data. The reproduction time decision unit 128 may calculate a reproduction time, for example, on the basis of how much the amount of audio data falls below a predetermined threshold in a case where a reproduction time is calculated on the basis of the amount of audio data. As a basic policy, the reproduction time decision unit 128 decides a longer reproduction time as the possibility of audio buffer depletion is higher. The reproduction time decision unit 128 decides a shorter reproduction time as the possibility of audio buffer depletion is lower. This makes it possible to reduce the possibility of audio buffer depletion by deciding a long reproduction time in a case where the possibility of audio buffer depletion is high. In contrast, deciding a short reproduction time makes it possible to reduce the unnaturalness of reproduced sounds caused by the insertion of a phrase in a case where the possibility of audio buffer depletion is low. It is to be noted that the possibility of audio buffer depletion is determined on the basis of at least any of the state of audio data received from the audio buffer unit 126 or the state of the network 14.

In addition, in a case where the network has a high communication speed, the amount of received audio data increases and the increase or decrease amount of audio data thus indicates increasing tendency. In a case where the network has a low communication speed, the amount of received audio data decreases and the increase or decrease amount of audio data thus indicates decreasing tendency. The reproduction time decision unit 128 may calculate a reproduction time, for example, on the basis of the amount of audio data that is decreased per unit time in a case where a reproduction time is calculated on the basis of the increase or decrease amount of audio data.

It is to be noted that the reproduction time decision unit 128 monitors the state of audio data and the state of the network 14. In a case where it is determined that a change in each state may influence the reproduction of audio data, the reproduction time decision unit 128 starts the above-described process of calculating a reproduction time. The reproduction time decision unit 128 may use the state of audio data or the state of the network as a determination criterion. For example, in a case where a relative value of the amount of audio data and buffer capacity falls below a threshold, the audio buffer may be depleted. The reproduction time decision unit 128 may thus determine that a change in the state of audio data may influence the reproduction of the audio data. In addition, for example, in a case where the communication speed of audio data decreases and the amount of audio data received per unit time falls below the amount of audio data reproduced per unit time, the increase or decrease amount of audio data indicates decreasing tendency. This causes the reproduction time decision unit 128 to determine that a change in the reception speed of audio data may influence the reproduction of the audio data.

In addition, the reproduction time decision unit 128 also has a function of a determination unit that determines whether to insert an insertion phrase into audio data or not, in accordance with whether or not a calculated reproduction time satisfies a predetermined condition. For example, a case is described where a condition "reproduction time is longer than a predetermined time" is used as the predetermined condition. For example, the long reproduction time of a phrase to be inserted means that the reception time of audio data to be secured to prevent sounds from being interrupted is also long. In a case where no phrase is inserted in spite of a long reproduction time, there is no securing the reception time of audio data, increasing the possibility of audio buffer depletion. Audio buffer depletion causes sounds to be interrupted, and a user thus feels that sounds being reproduced are interrupted. In a case where a reproduction time is longer than a predetermined time, the reproduction time decision unit 128 therefore determines that it is necessary to insert an insertion phrase into audio data. The reproduction time decision unit 128 then transmits the reproduction time and the necessity to insert an insertion phrase into audio data to the silent section detection unit 132 as a determination result.

In addition, for example, the short reproduction time of a phrase to be inserted means that the reception time of audio data to be secured to prevent sounds from being interrupted is also short. If the reception time of audio data to be secured is short, the possibility of the receivability of audio data before sounds being reproduced are interrupted is higher and the possibility of audio buffer depletion is lower. But for audio buffer depletion, no user feels that sounds being reproduced are interrupted. In a case where a reproduction time is shorter than a predetermined time, the reproduction time decision unit 128 therefore determines that it is unnecessary to insert any insertion phrase into audio data. The reproduction time decision unit 128 then transmits the unnecessity to insert any insertion phrase into audio data to the silent section detection unit 132 as a determination result.

It is to be noted that the above-described predetermined time may be statically decided. For example, the predetermined time may be statically decided in accordance with the size of an audio buffer.

In addition, the predetermined time may be dynamically decided. For example, the predetermined time may be dynamically decided in accordance with the appearance rate of silent sections. In a case where the appearance rate of silent sections (the number of silent sections per unit time) is low, there is little chance of allowing a silent section to be inserted. Accordingly, the predetermined time may be decided as being small if the appearance rate of silent sections is low. This allows the reproduction time decision unit 128 to frequently insert phrases in preparation for audio buffer depletion with no silent section appearing. In contrast, in a case where the appearance rate of silent sections is high, there is much chance of allowing a silent section to be inserted. Accordingly, the predetermined time may be decided as being great if the appearance rate of silent sections is low. This eliminates the necessity for the reproduction time decision unit 128 to insert a phrase in preparation for audio buffer depletion with no silent section appearing. The reproduction time decision unit 128 only has to insert a phrase at necessary timing. It is thus possible to decrease the insertion frequency of phrases and reduce the unnaturalness of reproduced sounds caused by the insertion of a phrase.

(4) Silent Section Detection Unit 132

The silent section detection unit 132 has a function of detecting a silent section in audio data. The silent section detection unit 132 detects a section whose sound volume is less than or equal to a predetermined value in audio data as a silent section. It is to be noted that the silent section is a section that include no sound (e.g., speaking voice) or has a sound volume less than or equal to a predetermined value in audio data. The silent section detection unit 132 decides the detected silent section as an insertion position, and transmits silent section information including information regarding the insertion position to the phrase insertion unit 140. The silent section detection unit 132 also concurrently transmits the reproduction time received from the reproduction time decision unit 128 to the phrase insertion unit 140. It is to be noted that the silent section detection unit 132 detects, as the silent section, a section between a sentence and a sentence in audio data that is silent, for example, in spite of the reproduction of the audio data.

In addition, the silent section detection unit 132 determines whether or not the above-described process of detecting a silent section is necessary, on the basis of a determination result received from the reproduction time decision unit 128. For example, in a case where the determination result indicates that it is necessary to insert an insertion phrase, the silent section detection unit 132 performs the process of detecting a silent section. In addition, for example, in a case where the determination result indicates that it is unnecessary to insert any insertion phrase, the silent section detection unit 132 does not perform the process of detecting a silent section, but transmits information indicating that it is unnecessary to insert any insertion phrase to the phrase insertion unit 140.

(5) Storage Unit 136

The storage unit 136 has a function of storing information regarding an insertion phrase. For example, the storage unit 136 stores information regarding an "insertion phrase", "length", and "audio data" as indicated in Table 1 below. The "insertion phrase" is a phrase to be inserted into audio data. For example, interjections such as "er" and "well" are stored as insertion phrases. In addition, the "length" is the reproduction time of an insertion phrase. For example, the insertion phrase "er" has a reproduction time of "2.0 seconds". In addition, "well" has a reproduction time of "3.0 seconds". In addition, the "audio data" mean the audio file of an insertion phrase. For example, the audio data of the insertion phrase "er" are stored as an audio file "0001.wav". In addition, the audio data of the insertion phrase "well" are stored as an audio file "0002.wav". Here, ".wav" in each audio file name is one of extensions each indicating a file format of audio data. It is to be noted that the file formats of audio data stored in the storage unit 136 are not limited in particular, but audio data having any file format may be stored. In addition, the length of an insertion phrase is not also limited in particular, but an insertion phrase having any length may be stored.

TABLE 1

Example of Insertion Phrase

| Insertion Phrase | Length | Audio Data |
| --- | --- | --- |
| er | 2.0 seconds | 0001.wav |
| well | 3.0 seconds | 0002.wav |

(6) Phrase Insertion Unit 140

The phrase insertion unit 140 has a function of inserting an insertion phrase into audio data. For example, upon receiving silent section information from the silent section detection unit 132, the phrase insertion unit 140 acquires, from the storage unit 136, an insertion phrase corresponding to a reproduction time concurrently received from the silent section detection unit 132. Here, the phrase insertion unit 140 acquires, from the storage unit 136, an insertion phrase having "length" corresponding to a reproduction time decided by the reproduction time decision unit 128. Specifically, the phrase insertion unit 140 acquires, from the storage unit 136, an insertion phrase having "length" equal to or greater than the length of a reproduction time decided by the reproduction time decision unit 128. For example, in a case of a reproduction time of 1.0 second, the phrase insertion unit 140 acquires, from the storage unit 136, "er" whose "length" indicated in Table 1 is 2.0 seconds. The phrase insertion unit 140 may then acquire, from the storage unit 136, "well" whose "length" indicated in Table 1 is 3.0 seconds. In addition, for example, in a case of a reproduction time of 2.5 seconds, the phrase insertion unit 140 acquires, from the storage unit 136, "well" whose "length" indicated in Table 1 is 3.0 seconds.

The phrase insertion unit 140 then inserts the insertion phrase acquired from the storage unit 136 at an insertion position in the audio data received from the audio buffer unit 126, on the basis of the silent section information acquired from the silent section detection unit 132. After the insertion phrase is inserted, the phrase insertion unit 140 transmits the audio data into which the insertion phrase is inserted to the audio data reproduction unit 144.

Here, a specific example is described for the phrase insertion unit 140 to insert an insertion phrase into audio data with reference to FIG. 3. The phrase insertion unit 140 inserts an insertion phrase into audio data 40 retained in the audio buffer unit 126 illustrated in FIG. 3. The horizontal axis of the graph of the waveform of the audio data 40 illustrated in FIG. 3 represents time, and the vertical axis represents amplitude. The audio data 40 before phrase insertion include a sound 400 and a sound 402, and has a silent section between the sound 400 and the sound 402. The phrase insertion unit 140 inserts an insertion phrase 500 into the silent section detected by the silent section detection unit 132. When the phrase insertion unit 140 inserts an insertion phrase into the audio data 40, audio data 50 are generated. The audio data 50 have the insertion phrase 500 inserted between the sound 400 and the sound 402. A comparison between the audio data 40 and the audio data 50 then indicates that the audio data 50 after phrase insertion have a longer reproduction time, and this allows the client terminal 10 to secure the time for receiving audio data that corresponds to the reproduction time of the inserted insertion phrase 500.

It is to be noted that the number of insertion phrases inserted by the phrase insertion unit 140 at one insertion position is not limited to one, but the phrase insertion unit 140 may insert any number of insertion phrases. In a case where a plurality of insertion phrases is inserted, the phrase insertion unit 140 acquires the plurality of phrases from the storage unit 136 to make the total "length" of the plurality of phrases equal to or more than the "length" of a reproduction time decided by the reproduction time decision unit 128.

In addition, in a case where the phrase insertion unit 140 inserts a plurality of phrases at one insertion position, the phrase insertion unit 140 may continuously insert the plurality of phrases. Specifically, even if the phrase insertion unit 140 acquires only any of "er" or "well" indicated in Table 1 in a case of a reproduction time of 4.0 seconds, the length of the insertion phrase does not exceed the reproduction time. The time secured for the client terminal 10 to receive audio data is not thus sufficient. The phrase insertion unit 140 then acquires both "er" and "well" and continuously inserts them like "er, well" to allow the total length of the insertion phrases to be 5.0 seconds and longer than the reproduction time. As described above, the phrase insertion unit 140 continuously inserts a plurality of insertion phrases to allow the client terminal 10 to sufficiently secure time for receiving audio data.

(7) Audio Data Reproduction Unit 144

The audio data reproduction unit 144 has a function of reproducing audio data. For example, the audio data reproduction unit 144 reproduces audio data received from the phrase insertion unit 140 to notify a user of the contents of the audio data. It is to be noted that audio data received from the phrase insertion unit 140 have an insertion phrase inserted thereto in some cases, and have no insertion phrase inserted thereto in other cases.

The configuration example of the client terminal 10-1 according to the first embodiment of the present disclosure has been described above with reference to FIGS. 2 and 3. Next, a configuration example of the server 30-1 according to the first embodiment of the present disclosure is described.

(2.1.2. Server 30-1)

The following describes a configuration example of the server 30-1 according to the first embodiment of the present disclosure with reference to FIG. 4. As illustrated in FIG. 4, the server 30-1 includes a communication unit 321 and an audio data generation unit 348.

(1) Communication Unit 321

The communication unit 321 is an interface for coupling the server 30-1 and the client terminal 10-1, and has a function for the server 30-1 to perform information communication with the client terminal 10-1. For example, the communication unit 321 transmits audio data generated by the audio data generation unit 348 in communication with the client terminal 10-1.

(2) Audio Data Generation Unit 348

The audio data generation unit 348 has a function of generating audio data. For example, the audio data generation unit 348 generates audio data including information of which a user is notified. Specifically, the audio data generation unit 348 generates audio data including information regarding news, information regarding the schedule of a user, information for a request of a user, or the like. It is to be noted that the file formats of audio data generated by the audio data generation unit 348 are not limited in particular, but audio data having any format may be generated.

The configuration example of the server 30-1 according to the first embodiment of the present disclosure has been described above with reference to FIG. 4. Next, a configuration example of an information processing system according to a comparative example is described.

(2.1.3. Comparative Example)

The following describes a configuration example of the information processing system according to the comparative example with reference to FIG. 5. As illustrated in FIG. 5, a client terminal 20 according to the comparative example includes a communication unit 221, an audio buffer unit 226, and an audio data reproduction unit 244. It is to be noted that the information processing system according to the comparative example includes a server having the same configuration and function as those of the server of the information processing system according to the first embodiment described in (2.1.2. Server 30-1). Accordingly, the description of a configuration example of the server according to the comparative example is omitted in this chapter.

(1) Communication Unit 221

The communication unit 221 is an interface for coupling the client terminal 20 and the server, and has a function for the client terminal 20 to perform information communication with the server. For example, the communication unit 221 receives audio data generated by the server in communication with the server. The communication unit 221 then outputs the received audio data to the audio buffer unit 226.

(2) Audio Buffer Unit 226

The function of the audio buffer unit 226 is the same as the function described in (2) Audio Buffer Unit 126 of (2.1.1. Client Terminal 10-1), and the description thereof is omitted in this chapter. It is, however, different that the audio buffer unit 226 transmits audio data to the audio data reproduction unit 244.

(3) Audio Data Reproduction Unit 244

The function of the audio data reproduction unit 244 is the same as the function described in (7) Audio Data Reproduction Unit 144 of (2.1.1. Client Terminal 10-1), and the description thereof is omitted in this chapter. It is, however, different that the audio data reproduction unit 244 receives audio data from the audio buffer unit 226.

The information processing system according to the comparative example is configured to retain audio data received from the server in the audio buffer unit 226, and reproduce the audio data in the audio data reproduction unit 244 as in the above-described configuration. In addition, as described in the configuration mentioned above, the information processing system according to the comparative example does not include the reproduction time calculation unit that calculates the reproduction time of an insertion phrase, the position decision unit that decides an insertion position at which an insertion phrase is inserted into audio data, or the insertion unit that inserts an insertion phrase. The information processing system according to the comparative example is therefore unable to adjust the reproduction time of audio data by inserting an insertion phrase even in a case where the audio data receiving speed is lower than the audio data reproducing speed. This causes the reproduction of the audio data to be interrupted.

The configuration example of the information processing system according to the comparative example has been described above with reference to FIG. 5. Next, an operation example of the information processing system according to the first embodiment of the present disclosure is described.

2.2. Operation Example

The following describes an operation example of the information processing system according to the first embodiment of the present disclosure with reference to FIG. 6. FIG. 6 is a flowchart illustrating a phrase insertion process according to the first embodiment of the present disclosure.

As illustrated in FIG. 6, the client terminal 10-1 repeats the processes of the flowchart until the reproduction of audio data is finished (step S1000). First, the communication unit 121 of the client terminal 10-1 receives audio data from the communication unit 321 of the server 30-1 (step S1004). The audio data received by the communication unit 121 are temporarily retained in the audio buffer unit. The reproduction time decision unit 128 of the client terminal 10-1 decides the reproduction time of a phrase to be inserted, on the basis of at least any of the state of the audio data of the audio buffer unit 126 and the state of the network (step S1008). After the reproduction time is decided, the reproduction time decision unit 128 confirms whether to insert a phrase or not, on the basis of whether or not the reproduction time satisfies a predetermined condition (step S1012). Here, the predetermined condition indicates whether or not, for example, the reproduction time is shorter than a predetermined time set in advance. In a case where the reproduction time is shorter than the predetermined time, the reproduction time decision unit 128 determines that it is unnecessary to insert any phrase (step S1012/NO), and reproduces audio data without inserting a phrase into the audio data (step S1024).

In a case where the reproduction time is longer than the predetermined time, the reproduction time decision unit 128 determines that it is necessary to insert a phrase (step S1012/YES), and the flow proceeds to step S1016. When the reproduction time decision unit 128 determines that it is necessary to insert a phrase, the silent section detection unit 132 detects a silent section in the audio data (step S1016). When the silent section detection unit 132 detects a silent section, the phrase insertion unit 140 inserts a phrase acquired from the storage unit 136 into the silent section (step S1020). After phrase insertion, the audio data reproduction unit 144 reproduces the audio data (step S1024).

The operation example of the information processing system according to the first embodiment of the present disclosure has been described above with reference to FIG. 6.

The information processing system according to the first embodiment of the present disclosure has been described above with reference to FIGS. 2 to 6. Next, an information processing system according to a second embodiment of the present disclosure is described.

3. SECOND EMBODIMENT

In the information processing system according to the first embodiment, the client terminal 10 performs the process of deciding the insertion position of a phrase to be inserted into audio data, but the above-described process is performed by the server 30 in an information processing system according to a second embodiment.

<3.1. Configuration Example>

(3.1.1. Client Terminal 10-2)

The following describes a configuration example of a client terminal 10-2 according to the second embodiment of the present disclosure with reference to FIG. 7. As illustrated in FIG. 7, the client terminal 10-2 includes a communication unit 122, the audio buffer unit 126, the reproduction time decision unit 128, the storage unit 136, the phrase insertion unit 140, and the audio data reproduction unit 144. The client terminal 10-2 has a configuration corresponding to the configuration of the client terminal 10-1 according to the first embodiment illustrated in FIG. 2 from which the silent section detection unit 132 is removed.

(1) Communication Unit 122

The communication unit 122 is an interface for coupling the client terminal 10-2 and a server 30-2, and has a function for the client terminal 10-2 to perform information communication with the server 30-2. For example, the communication unit 122 receives audio data generated by the server 30-2 in communication with the server 30-2. The communication unit 122 then outputs the received audio data to the audio buffer unit 126. In addition, for example, the communication unit 122 receives silent section information detected by the server 30-2 in communication with the server 30-2. The communication unit 122 then outputs the received silent section information to the phrase insertion unit 140.

(2) Audio Buffer Unit 126

The function of the audio buffer unit 126 is the same as the function described in <2.1. Configuration Example>, and the description thereof is omitted in this chapter.

(3) Reproduction Time Decision Unit 128

The function of the reproduction time decision unit 128 is the same as the function described in <2.1. Configuration Example>, and the description thereof is omitted in this chapter. It is, however, different that the reproduction time decision unit 128 transmits a reproduction time and a determination result to the phrase insertion unit 140.

(4) Storage Unit 136

The function of the storage unit 136 is the same as the function described in <2.1. Configuration Example>, and the description thereof is omitted in this chapter.

(5) Phrase Insertion Unit 140

The function of the phrase insertion unit 140 is the same as the function described in <2.1. Configuration Example>, and the description thereof is omitted in this chapter. It is, however, different that the phrase insertion unit 140 receives silent section information from the communication unit 122 and the phrase insertion unit 140 receives a reproduction time from the reproduction time decision unit 128.

(6) Audio Data Reproduction Unit 144

The function of the audio data reproduction unit 144 is the same as the function described in <2.1. Configuration Example>, and the description thereof is omitted in this chapter.

The configuration example of the client terminal 10-2 according to the second embodiment of the present disclosure has been described above with reference to FIG. 7. Next, a configuration example of the server 30-2 according to the second embodiment of the present disclosure is described.

(3.1.2. Server 30-2)

The following describes a configuration example of the server 30-2 according to the second embodiment of the present disclosure with reference to FIG. 8. As illustrated in FIG. 8, the server 30-2 includes a communication unit 322, a silent section detection unit 332, and the audio data generation unit 348. The server 30-2 has a configuration corresponding to the configuration of the server 30-1 according to the first embodiment illustrated in FIG. 4 to which the silent section detection unit 332 is added.

(1) Communication Unit 322

The communication unit 322 is an interface for coupling the server 30-2 and the client terminal 10-2, and has a function for the server 30-2 to perform information communication with the client terminal 10-2. For example, the communication unit 322 transmits audio data generated by the audio data generation unit 348 in communication with the client terminal 10-2. In addition, for example, the communication unit 322 transmits silent section information detected by the silent section detection unit 332 in communication with the client terminal 10-2.

(2) Silent Section Detection Unit 332

The function of the silent section detection unit 332 is the same as the function described in (4) Silent Section Detection Unit 132 of (2.1.1. Client Terminal 10-1), and the description thereof is omitted in this chapter. It is, however, different that the silent section detection unit 332 receives audio data from the audio data generation unit 348 and the silent section detection unit 332 transmits silent section information to the communication unit 322.

(3) Audio Data Generation Unit 348

The function of the audio data generation unit 348 is the same as the function described in <2.1. Configuration Example>, and the description thereof is omitted in this chapter. It is, however, different that the audio data generation unit 348 transmits audio data to the silent section detection unit 332.

The configuration example of the server 30-2 according to the second embodiment of the present disclosure has been described above with reference to FIG. 8. Next, an operation example of the information processing system according to the second embodiment of the present disclosure is described.

<3.2. Operation Example>

The following describes an operation example of the information processing system according to the second embodiment of the present disclosure with reference to FIG. 9. FIG. 9 is a flowchart illustrating a phrase insertion process according to the second embodiment of the present disclosure.

As illustrated in FIG. 9, the client terminal 10-2 repeats the processes of the flowchart until the reproduction of audio data is finished (step S2000). First, the communication unit 122 of the client terminal 10-2 receives audio data and silent section information from the communication unit 322 of the server 30-2 (step S2004). The audio data received by the communication unit 122 are temporarily retained in the audio buffer unit. In addition, the silent section information received by the communication unit 122 is outputted to the phrase insertion unit 140 of the client terminal 10-2. The reproduction time decision unit 128 of the client terminal 10-2 decides the reproduction time of a phrase to be inserted, on the basis of at least any of the state of the audio data of the audio buffer unit 126 and the state of the network (step S2008). After the reproduction time is decided, the reproduction time decision unit 128 confirms whether to insert a phrase or not, on the basis of whether or not the reproduction time satisfies a predetermined condition (step S2012). Here, the predetermined condition indicates whether or not, for example, the reproduction time is shorter than a predetermined time set in advance. In a case where the reproduction time is shorter than the predetermined time, the reproduction time decision unit 128 determines that it is unnecessary to insert any phrase (step S2012/NO), and reproduces audio data without inserting a phrase into the audio data (step S2020).

In a case where the reproduction time is longer than the predetermined time, the reproduction time decision unit 128 determines that it is necessary to insert a phrase (step S2012/YES), and the flow proceeds to step S2016. The phrase insertion unit 140 inserts a phrase acquired from the storage unit 136 to the silent section on the basis of the silent section information received from the communication unit 122 (step S2016). After phrase insertion, the audio data reproduction unit 144 reproduces the audio data (step S2020).

The operation example of the information processing system according to the second embodiment of the present disclosure has been described above with reference to FIG. 9.

The information processing system according to the second embodiment of the present disclosure has been described above with reference to FIGS. 7 to 9. Next, an information processing system according to a third embodiment of the present disclosure is described.

4. THIRD EMBODIMENT

In the information processing system according to the third embodiment of the present disclosure, the server 30 generates audio data and sentence data, and transmits the generated audio data and sentence data to the client terminal 10. The client terminal 10 that receives the audio data and the sentence data then performs the processes of determining whether to insert a phrase into the audio data or not, deciding the insertion position of a phrase to be inserted into the audio data, and inserting a phrase at the insertion position.

<4.1. Configuration Example>
(4.1.1. Client Terminal 10-3)

The following describes a configuration example of a client terminal 10-3 according to the third embodiment of the present disclosure with reference to FIG. 10. As illustrated in FIG. 10, the client terminal 10-3 includes a communication unit 123, the audio buffer unit 126, the reproduction time decision unit 128, a sentence analysis unit 152, the storage unit 136, the phrase insertion unit 140, and the audio data reproduction unit 144.

(1) Communication Unit 123

The communication unit 123 is an interface for coupling the client terminal 10-3 and a server 30-3, and has a function for the client terminal 10-3 to perform information communication with the server 30-3. For example, the communication unit 123 receives audio data generated by the server 30-3 in communication with the server 30-3. The communication unit 123 then outputs the received audio data to the audio buffer unit 126. In addition, for example, the communication unit 123 receives sentence data generated by the server 30-3 in communication with the server 30-3. The communication unit 123 then outputs the received sentence data to the sentence analysis unit 152.

(2) Audio Buffer Unit 126

The function of the audio buffer unit 126 is the same as the function described in <2.1. Configuration Example>, and the description thereof is omitted in this chapter.

(3) Reproduction Time Decision Unit 128

The function of the reproduction time decision unit 128 is the same as the function described in <2.1. Configuration Example>, and the description thereof is omitted in this chapter. The reproduction time decision unit 128, however, transmits information indicating that it is unnecessary to insert an insertion phrase into audio data or a reproduction time, and a determination result to the sentence analysis unit 152.

(4) Sentence Analysis Unit 152

The sentence analysis unit 152 has a function of detecting sentence information of sentence data. The sentence information includes a punctuation mark, a topic change point, and the like in addition to a phrasal delimitation. The sentence analysis unit 152 analyzes the sentence data received from the communication unit 123 to detect the sentence information of the sentence data. The sentence analysis unit 152 then decides the insertion position of a phrase on the basis of the detected sentence information, and transmits the sentence information including information regarding the insertion position to the phrase insertion unit 140. The sentence analysis unit 152 concurrently transmits the reproduction time received from the reproduction time decision unit 128 to the phrase insertion unit 140.

In addition, the sentence analysis unit 152 determines whether or not the above-described process of detecting sentence information is necessary, on the basis of a determination result received from the reproduction time decision unit 128. For example, in a case where the determination result indicates that it is necessary to insert an insertion phrase, the sentence analysis unit 152 performs the process of detecting sentence information. In addition, for example, in a case where the determination result indicates that it is unnecessary to insert any insertion phrase, the sentence analysis unit 152 does not perform the process of detecting sentence information, but transmits information indicating that it is unnecessary to insert any insertion phrase to the phrase insertion unit 140.

(5) Storage Unit 136

The function of the storage unit 136 is the same as the function described in <2.1. Configuration Example>, and the description thereof is omitted in this chapter.

(6) Phrase Insertion Unit 140

The function of the phrase insertion unit 140 is the same as the function described in <2.1. Configuration Example>, and the description thereof is omitted in this chapter. It is, however, different that the phrase insertion unit 140 inserts an insertion phrase at a phrasal delimitation in the audio data received from the audio buffer unit 126, on the basis of the sentence information received from the sentence analysis unit 152. It is to be noted that an insertion position at which the phrase insertion unit 140 inserts an insertion phrase is not limited to a phrasal delimitation, but may be, for example, a punctuation mark, a topic change point, or the like.

(7) Audio Data Reproduction Unit 144

The function of the audio data reproduction unit 144 is the same as the function described in <2.1. Configuration Example>, and the description thereof is omitted in this chapter.

The configuration example of the client terminal 10-3 according to the third embodiment of the present disclosure has been described above with reference to FIG. 10. Next, a configuration example of the server 30-3 according to the third embodiment of the present disclosure is described.

(4.1.2. Server 30-3)

The following describes a configuration example of the server 30-3 according to the third embodiment of the present disclosure with reference to FIG. 11. As illustrated in FIG. 11, the server 30-3 includes a communication unit 323, a sentence data generation unit 356, and the audio data generation unit 348.

(1) Communication Unit 323

The communication unit 323 is an interface for coupling the server 30-3 and the client terminal 10-3, and has a function for the server 30-3 to perform information communication with the client terminal 10-3. For example, the communication unit 323 transmits audio data generated by the audio data generation unit 348 in communication with the client terminal 10-3. In addition, for example, the communication unit 323 transmits sentence data generated by the sentence data generation unit 356 in communication with the client terminal 10-3.

(2) Sentence Data Generation Unit 356

The sentence data generation unit 356 has a function of generating sentence data. In addition, the sentence data generation unit 356 also has a speech recognition function. For example, when the sentence data generation unit 356 receives audio data generated by the audio data generation unit 348, the sentence data generation unit 356 uses the speech recognition function to analyze the audio data and converts the contents of the audio data into text on the basis of an analysis result to generate sentence data.

(3) Audio Data Generation Unit 348

The function of the audio data generation unit 348 is the same as the function described in <2.1. Configuration Example>, and the description thereof is omitted in this chapter. The audio data generation unit 348, however, transmits the generated audio data to the sentence data generation unit 356.

The configuration example of the server 30-3 according to the third embodiment of the present disclosure has been described above with reference to FIG. 11. It is to be noted that an example has been described in which the audio data generation unit 348 generates audio data and the sentence data generation unit 356 generates sentence data from the audio data in the above-described configuration example, but the processes of generating audio data and sentence data are not limited to the above-described example. For example, processes may be adopted of causing the sentence data generation unit 356 to generate sentence data, and causing the audio data generation unit 348 to generate audio data from the sentence data. It is possible to achieve the processes by installing TTS (Text-to-speech) in the audio data generation unit 348. The use of the TTS function for reading text aloud allows the audio data generation unit 348 to generate audio data. Therefore, the sentence data generation unit 356 generates sentence data earlier and the audio data generation unit 348 reads the sentence data aloud with the TTS, thereby allowing the audio data generation unit 348 to generate audio data.

Next, an operation example of the information processing system according to the third embodiment of the present disclosure is described.

<4.2. Operation Example>

The following describes an operation example of the information processing system according to the third embodiment of the present disclosure with reference to FIG. 12. FIG. 12 is a flowchart illustrating a phrase insertion process according to the third embodiment of the present disclosure.

As illustrated in FIG. 12, the client terminal 10-3 repeats the processes of the flowchart until the reproduction of audio data is finished (step S3000). First, the communication unit 123 of the client terminal 10-3 receives audio data and sentence data from the communication unit 323 of the server 30-3 (step S3004). The audio data received by the communication unit 123 are temporarily retained in the audio buffer unit. In addition, the sentence data received by the communication unit 123 is outputted to the sentence analysis unit 152. The reproduction time decision unit 128 of the client terminal 10-3 decides the reproduction time of a phrase to be inserted, on the basis of the state of the audio data of the audio buffer unit 126 and the state of the network (step S3008). After the reproduction time is decided, the reproduction time decision unit 128 confirms whether to insert a phrase or not, on the basis of whether or not the reproduction time satisfies a predetermined condition (step S3012). Here, the predetermined condition indicates whether or not, for example, the reproduction time is shorter than a predetermined time set in advance. In a case where the reproduction time is shorter than the predetermined time, the reproduction time decision unit 128 determines that it is unnecessary to insert any phrase (step S3012/NO), and reproduces audio data without inserting a phrase into the audio data (step S3024).

In a case where the reproduction time is longer than the predetermined time, the reproduction time decision unit 128 determines that it is necessary to insert a phrase (step S3012/YES), and the flow proceeds to step S3016. When the reproduction time decision unit 128 determines that it is necessary to insert a phrase, the sentence analysis unit 152 analyzes sentence data received from the communication unit 123 (step S3016). Upon receiving sentence information indicating an analysis result of the sentence data, the phrase insertion unit 140 inserts a phrase acquired from the storage unit 136 at a phrasal delimitation in the audio data, on the basis of the sentence information (step S3020). After phrase insertion, the audio data reproduction unit 144 reproduces the audio data (step S3024).

The operation example of the information processing system according to the third embodiment of the present disclosure has been described above with reference to FIG. 12.

The information processing system according to the third embodiment of the present disclosure has been described above with reference to FIGS. 10 to 12. Next, an information processing system according to a fourth embodiment of the present disclosure is described.

5. FOURTH EMBODIMENT

In the information processing system according to the third embodiment, the client terminal 10 performs the process of deciding the insertion position of a phrase to be inserted into audio data, but the above-described process is performed by the server 30 in the information processing system according to the fourth embodiment.

<5.1. Configuration Example>

(5.1.1. Client Terminal 10-4)

The following describes a configuration example of a client terminal 10-4 according to the fourth embodiment of the present disclosure with reference to FIG. 13. As illustrated in FIG. 13, the client terminal 10-4 includes a communication unit 124, the audio buffer unit 126, the reproduction time decision unit 128, the storage unit 136, the phrase insertion unit 140, and the audio data reproduction unit 144.

(1) Communication Unit 124

The communication unit 124 is an interface for coupling the client terminal 10-4 and a server 30-4, and has a function for the client terminal 10-4 to perform information communication with the server 30-4. For example, the communication unit 124 receives audio data generated by the server 30-4 in communication with the server 30-4. The communication unit 124 then outputs the received audio data to the audio buffer unit 126. In addition, for example, the communication unit 124 receives sentence information indicating a result obtained by the server 30-4 analyzing audio data in communication with the server 30-4. The communication unit 124 then outputs the received sentence information to the phrase insertion unit 140.

(2) Audio Buffer Unit 126

The function of the audio buffer unit 126 is the same as the function described in <2.1. Configuration Example>, and the description thereof is omitted in this chapter.

(3) Reproduction Time Decision Unit 128

The function of the reproduction time decision unit 128 is the same as the function described in <2.1. Configuration Example>, and the description thereof is omitted in this chapter. It is, however, different that the reproduction time decision unit 128 transmits a reproduction time and a determination result to the phrase insertion unit 140.

(4) Storage Unit 136

The function of the storage unit 136 is the same as the function described in <2.1. Configuration Example>, and the description thereof is omitted in this chapter.

(5) Phrase Insertion Unit 140

The function of the phrase insertion unit 140 is the same as the function described in <2.1. Configuration Example>, and the description thereof is omitted in this chapter. It is, however, different that the phrase insertion unit 140 receives sentence information from the communication unit 124 and the phrase insertion unit 140 receives a reproduction time from the reproduction time decision unit 128.

(6) Audio Data Reproduction Unit 144

The function of the audio data reproduction unit 144 is the same as the function described in <2.1. Configuration Example>, and the description thereof is omitted in this chapter.

The configuration example of the client terminal 10-4 according to the fourth embodiment of the present disclosure has been described above with reference to FIG. 13. Next, a configuration example of the server 30-4 according to the fourth embodiment of the present disclosure is described.

(5.1.2. Server 30-4)

The following describes a configuration example of the server 30-4 according to the fourth embodiment of the present disclosure with reference to FIG. 14. As illustrated in FIG. 14, the server 30-4 includes a communication unit 324, a sentence analysis unit 352, and the audio data generation unit 348.

(1) Communication Unit 324

The communication unit 324 is an interface for coupling the server 30-4 and the client terminal 10-4, and has a function for the server 30-4 to perform information communication with the client terminal 10-4. For example, the communication unit 324 transmits audio data generated by the audio data generation unit 348 in communication with the client terminal 10-4. In addition, for example, the communication unit 324 transmits sentence information indicating a result obtained by the sentence analysis unit 352 analyzing audio data in communication with the client terminal 10-4.

(2) Sentence Analysis Unit 352

The function of the sentence analysis unit 352 is the same as the function described in (4) Sentence Analysis Unit 152 of (4.1.1. Client Terminal 10-3), and the description thereof is omitted in this chapter. It is, however, different that the sentence analysis unit 352 receives audio data from the audio data generation unit 348 and the sentence analysis unit 352 transmits sentence information to the communication unit 324.

(3) Audio Data Generation Unit 348

The function of the audio data generation unit 348 is the same as the function described in <2.1. Configuration Example>, and the description thereof is omitted in this chapter.

The configuration example of the server 30-4 according to the fourth embodiment of the present disclosure has been described above with reference to FIG. 14. Next, an operation example of the information processing system according to the fourth embodiment of the present disclosure is described.

<5.2. Operation Example>

The following describes an operation example of the information processing system according to the fourth embodiment of the present disclosure with reference to FIG. 15. FIG. 15 is a flowchart illustrating a phrase insertion process according to the fourth embodiment of the present disclosure.

As illustrated in FIG. 15, the client terminal 10-4 repeats the processes of the flowchart until the reproduction of audio data is finished (step S4000). First, the communication unit 124 of the client terminal 10-4 receives audio data and sentence information from the communication unit 324 of the server 30-4 (step S4004). The audio data received by the communication unit 124 are temporarily retained in the audio buffer unit. In addition, the sentence information received by the communication unit 124 is outputted to the phrase insertion unit 140 of the client terminal 10-4. The reproduction time decision unit 128 of the client terminal 10-4 decides the reproduction time of a phrase to be inserted, on the basis of the state of the audio data of the audio buffer unit 126 and the state of the network (step S4008). After the reproduction time is decided, the reproduction time decision unit 128 confirms whether to insert a phrase or not, on the basis of whether or not the reproduction time satisfies a predetermined condition (step S4012). Here, the predetermined condition indicates whether or not, for example, the reproduction time is shorter than a predetermined time set in advance. In a case where the reproduction time is shorter than the predetermined time, the reproduction time decision unit 128 determines that it is unnecessary to insert any phrase (step S4012/NO), and reproduces audio data without inserting a phrase into the audio data (step S4020).

In a case where the reproduction time is longer than the predetermined time, the reproduction time decision unit 128 determines that it is necessary to insert a phrase (step S4012/YES), and the flow proceeds to step S4016. The phrase insertion unit 140 inserts a phrase acquired from the storage unit 136 into the audio data on the basis of the sentence information received from the communication unit 124 (step S4016). After phrase insertion, the audio data reproduction unit 144 reproduces the audio data (step S4020).

The operation example of the information processing system according to the fourth embodiment of the present disclosure has been described above with reference to FIG. 15.

The information processing system according to the fourth embodiment of the present disclosure has been described above with reference to FIGS. 13 to 15. Next, an information processing system according to a fifth embodiment of the present disclosure is described.

6. FIFTH EMBODIMENT

An example in which a phrase is inserted into audio data has been described in each of the information processing systems according to the first to fourth embodiments, but an example in which a phrase in audio data is replaced is described in the information processing system according to the fifth embodiment.

<6.1. Configuration Example>
(6.1.1. Client Terminal 10-5)

The following describes a configuration example of a client terminal 10-5 according to the fifth embodiment of the present disclosure with reference to FIGS. 16 and 17. As illustrated in FIG. 16, the client terminal 10-5 includes a communication unit 125, an audio data saving unit 160, the audio buffer unit 126, the reproduction time decision unit 128, the sentence analysis unit 152, the storage unit 136, a phrase replacement unit 164, and the audio data reproduction unit 144.

(1) Communication Unit 125

The communication unit 125 is an interface for coupling the client terminal 10-5 and a server 30-5, and has a function for the client terminal 10-5 to perform information communication with the server 30-5. For example, the communication unit 125 receives audio data generated by the server 30-5 in communication with the server 30-5. The communication unit 125 then outputs the received audio data to the audio buffer unit 126. In addition, for example, the communication unit 125 receives sentence data generated by the server 30-5 in communication with the server 30-5. The communication unit 125 then outputs the received sentence data to the sentence analysis unit 152.

(2) Audio Data Saving Unit 160

The audio data saving unit 160 has a function of temporarily saving audio data and acquiring an insertion phrase from the saved audio data. For example, the audio data saving unit 160 temporarily saves and analyzes sentence data received from the communication unit 125, and detects a phrase that is usable as an insertion phrase used to replace a phrase. Specifically, in a case where the sentence data include a demonstrative word such as "that" or "there", the audio data saving unit 160 searches the sentence data for a phrase existing before the demonstrative word and referred to by the demonstrative word. In a case where the reproduction time of the phrase found as a result of the search is longer than that of the corresponding demonstrative word, the phrase is detected as a phrase that is usable as an insertion phrase. The audio data saving unit 160 then extracts the sound of the phrase determined to be usable from the audio data, and saves the extracted sound in the storage unit 136 as an audio data cache. It is to be noted that the audio data cache is cache data that are temporarily saved, and may be thus deleted after the audio buffer unit 126 finishes the reproduction of the audio data.

(3) Audio Buffer Unit 126

The function of the audio buffer unit is the same as the function described in <2.1. Configuration Example>, and the description thereof is omitted in this chapter. It is, however, different that the audio buffer unit 126 receives audio data from the audio data saving unit 160. In addition, it is also different that the audio buffer unit 126 transmits audio data to the reproduction time decision unit 128 and the phrase replacement unit 164.

(4) Reproduction Time Decision Unit 128

The function of the reproduction time decision unit is the same as the function described in <2.1. Configuration Example>, and the description thereof is omitted in this chapter. It is, however, different that the reproduction time decision unit 128 transmits a reproduction time and a determination result to the sentence analysis unit 152.

(5) Sentence Analysis Unit 152

The sentence analysis unit 152 has a function of detecting replacement target phrases on the basis of sentence data and deciding a phrase to be replaced from the detected replacement targets. Each of the replacement target phrases is, for example, a demonstrative word included in sentence data. In addition, the phrase to be replaced is a phrase that is replaced to make it possible to secure time for receiving audio data. For example, the sentence analysis unit 152 analyzes sentence data received from the communication unit 125 to detect replaceable phrases as replacement targets. The sentence analysis unit 152 then decides a phrase to be replaced from the replacement targets on the basis of a reproduction time received from the reproduction time decision unit 128 and the length of an audio data cache saved in the storage unit 136. After a phrase to be replaced is decided, the sentence analysis unit 152 transmits, to the phrase replacement unit 164, replacement information that is information regarding the phrase to be replaced.

In addition, the sentence analysis unit 152 determines whether or not the above-described process of detecting a phrase serving as a replacement target is necessary, on the basis of a determination result received from the reproduction time decision unit 128. For example, in a case of a determination result indicating that it is necessary to insert an insertion phrase, the sentence analysis unit 152 performs the process of detecting a phrase serving as a replacement target. In addition, for example, in a case of the determination result indicating that it is unnecessary to insert any insertion phrase, the sentence analysis unit 152 does not perform the process of detecting a phrase serving as a replacement target, but transmits information indicating that it is unnecessary to insert any insertion phrase to the phrase insertion unit 140.

(6) Storage Unit 136

The storage unit 136 has a function of storing information regarding an insertion phrase for replacing a phrase in audio data. For example, the storage unit 136 stores information regarding an "insertion phrase", "length", and "audio data" as indicated in Table 2 below. The "insertion phrase" is a phrase used to replace a phrase in audio data. For example, phrases such as "AAA Drugstore BBB Branch" and "CCC Prefecture DDD Ward" are stored as insertion phrases. In addition, the "length" is the reproduction time of an insertion phrase. For example, the insertion phrase "AAA Drugstore BBB Branch" has a reproduction time of "3.0 seconds". In addition, "CCC Prefecture DDD Ward" has a reproduction time of "2.0 seconds". In addition, the "audio data" mean the audio file of an insertion phrase. For example, the audio data of the insertion phrase "AAA Drugstore BBB Branch" are stored as an audio file "20171023103516.wav". In addition, the audio data of the insertion phrase "CCC Prefecture DDD Ward" are stored as an audio file "20171023103602.wav". It is to be noted that the date and time when the audio data saving unit 160 acquires audio data are set as the file name of the audio data in the above-described example. The file name of audio data is not, however, limited to the acquisition date and time of the audio data, but any file name may be set. In addition, the file formats of audio data stored in the storage unit 136 are not limited in particular, but audio data having any file format may be stored. In addition, the length of an insertion phrase is not also limited in particular, but an insertion phrase having any length may be stored.

TABLE 2

Example of Audio Data Cache

| Insertion Phrase | Length | Audio Data |
|---|---|---|
| "AAA Drugstore BBB Branch" | 3.0 seconds | 20171023103516.wav |
| "CCC Prefecture DDD Ward" | 2.0 seconds | 20171023103602.wav |

(7) Phrase Replacement Unit 164

The phrase replacement unit 164 has a function of replacing a phrase in audio data. For example, upon receiving replacement information from the sentence analysis unit 152, the phrase replacement unit 164 acquires an insertion phrase corresponding to the replacement information from the storage unit 136. The phrase replacement unit 164 then replaces a phrase in the audio data on the basis of the replacement information.

Here, a specific example is described for the phrase replacement unit 164 to replace a phrase in audio data with reference to FIG. 17. The phrase replacement unit 164 replaces a phrase in audio data 60 retained in the audio buffer unit 126 illustrated in FIG. 17. The horizontal axis of the graph of the waveform of the audio data 60 illustrated in FIG. 17 represents time, and the vertical axis represents amplitude. The audio data 60 before phrase replacement include a sound 600 and a sound 602. The phrase replacement unit 164 replaces a replacement target phrase decided by the sentence analysis unit 152. In the example illustrated in FIG. 17, if the replacement target phrase is included in the sound 602, the phrase replacement unit 164 replaces the replacement target phrase included in the sound 602 to generate a sound 700. Audio data 70 after phrase replacement include a sound 700. A comparison between the audio data 60 and the audio data 70 then indicates that the audio data 70 after phrase replacement has a longer reproduction time, and this allows the client terminal 10 to secure the time for receiving audio data that corresponds to the different in reproduction time between the replacement target phrase and the phrase used for the replacement.

(8) Audio Data Reproduction Unit 144

The function of the audio data reproduction unit is the same as the function described in <2.1. Configuration Example>, and the description thereof is omitted in this chapter.

The configuration example of the client terminal 10-5 according to the fifth embodiment of the present disclosure has been described above with reference to FIGS. 16 and 17. Next, a configuration example of the server 30-5 according to the fifth embodiment of the present disclosure is described.

(6.1.2. Server 30-5)

A configuration example of the server 30-5 according to the fifth embodiment of the present disclosure is the same as the configuration example of the server 30-3 described in (4.1.2. Server 30-3), and the description thereof is omitted in this chapter.

The configuration example of the server 30-5 according to the fifth embodiment of the present disclosure has been described above described. Next, an operation example of the information processing system according to the fifth embodiment of the present disclosure is described.

<6.2. Operation Example>

The following describes an operation example of the information processing system according to the fifth embodiment of the present disclosure with reference to FIG. 18. FIG. 18 is a flowchart illustrating a phrase replacement process according to the fifth embodiment of the present disclosure.

As illustrated in FIG. 18, the client terminal 10-5 repeats the processes of the flowchart until the reproduction of audio data is finished (step S5000). First, the communication unit 125 of the client terminal 10-5 receives audio data and sentence data from a communication unit 325 of the server 30-5 (step S5004). The audio data received by the communication unit 125 are temporarily saved in the audio data saving unit 160, and then retained in the audio buffer unit 126. In addition, the sentence data received by the communication unit 125 is outputted to the sentence analysis unit 152. The reproduction time decision unit 128 of the client terminal 10-5 decides the reproduction time of an insertion phrase, on the basis of the state of the audio data of the audio buffer unit 126 and the state of the network (step S5008). After the reproduction time is decided, the reproduction time decision unit 128 confirms whether to perform replacement with an insertion phrase or not, on the basis of whether or not the reproduction time satisfies a predetermined condition (step S5012). Here, the predetermined condition indicates whether or not, for example, the reproduction time is shorter than a predetermined time set in advance. In a case where the reproduction time is shorter than the predetermined time, the reproduction time decision unit 128 determines that it is unnecessary to replace any phrase (step S5012/NO), and reproduces audio data without replacing any phrase in the audio data (step S5024).

In a case where the reproduction time is longer than the predetermined time, the reproduction time decision unit 128 determines that it is necessary to replace a phrase (step S5012/YES), and the flow proceeds to step S5016. When the reproduction time decision unit 128 determines that it is necessary to replace a phrase, the sentence analysis unit 152 analyzes sentence data received from the communication unit 125 (step S5016). When sentence information is acquired by analyzing the sentence data, the phrase replacement unit 164 replaces a target phrase included in the audio data with a phrase acquired from the storage unit 136, on the basis of the sentence information (step S020). After phrase replacement, the audio data reproduction unit 144 reproduces the audio data (step S5024).

The operation example of the information processing system according to the fifth embodiment of the present disclosure has been described above with reference to FIG. 18.

The information processing system according to the fifth embodiment of the present disclosure has been described above with reference to FIGS. 16 to 18. Next, modification examples of the embodiment of the present disclosure are described.

7. MODIFICATION EXAMPLES

The following describes the modification examples of the embodiment of the present disclosure. It is to be noted that, the respective modification examples described below may be separately applied to the embodiment of the present disclosure, or may be applied to the embodiment of the present disclosure in combination. In addition, the respective modifications may be applied instead of the configuration described in the embodiment of the present disclosure, or may be applied in addition to the configuration described in the embodiment of the present disclosure.

In the above-described respective embodiments, the method of deciding a silent section in audio data as an insertion position, the method of deciding a phrasal delimitation in audio data as an insertion position, and the method of deciding the position of a replaceable phrase in audio data as an insertion position have been described. The client terminal 10 may include a component that is able to execute the plurality of methods described above to switch the methods of deciding an insertion position. For example, it is assumed that the client terminal 10 has the function of deciding a silent section as an insertion position as a processing mode 1, the function of deciding a phrasal delimitation as an insertion position as a processing mode 2, and the function of deciding the position of a replaceable phrase as an insertion position as a processing mode 3. In a case where the silent section detection unit 132 fails to detect a silent section and fails to decide an insertion position when the processing mode 1 is set, the client terminal 10 switches the methods of inserting a phrase by switching the processing mode 1 to the processing mode 2. Then, in a case where the sentence analysis unit 152 succeeds in deciding a phrasal delimitation between phrases as an insertion position in the processing mode 2, the phrase insertion unit 140 inserts a phrase at the phrasal delimitation. In addition, in a case where the sentence analysis unit 152 fails to decide a phrasal delimitation as an insertion position in the processing mode 2, the client terminal 10 may switch the processing mode 2 to the processing mode 3.

As described above, the client terminal 10 is able to switch the methods of deciding an insertion position. Accordingly, in a case where it is not possible to decide an insertion position in a certain method of deciding an insertion position, the client terminal 10 switches the method of deciding an insertion position to another method of deciding an insertion position. This allows the client terminal 10 to decide an insertion position in the other method of deciding an insertion position.

It is to be noted that the order to switch the processing modes is not limited to the above-described example. For example, the respective processing modes may be switched in any order in accordance with the detection status of the insertion position of a phrase. In addition, the respective processes in the plurality of modes may be concurrently executed to detect a plurality of insertion positions, and a phrase may be then inserted at the more optimum insertion position.

The modification examples of the embodiment of the present disclosure have been described above. Next, application examples of the information processing system according to an embodiment of the present disclosure are described.

8. APPLICATION EXAMPLES

The following describes application examples of the information processing system according to an embodiment of the present disclosure.

<8.1. Application Example of First Embodiment and Second Embodiment>

The following describes an application example of the case described in the first embodiment and the second embodiment where a phrase is inserted into a silent section in audio data.

(8.1.1. Agent Device that Inserts Interjection in accordance with Communication Condition)

The following describes an example in which the first embodiment or the second embodiment is applied to an interactive agent system. Here, the interactive agent system is a system that makes a response including appropriate information to an input of a user. For the interactive agent system, an agent device in which a function of the client terminal 10 is implemented as an application is used as the client terminal 10. The agent device is able to aurally respond to an input of a user. In addition, it is assumed that the agent device is coupled to a server having the same function as that of the server 30 via a network. It is to be noted that the server generates audio data for the agent device to respond to an input of a user, transmits the audio data to the agent device via the network, and the agent device reproduces the audio data in the interactive agent system.

As a specific application example, a case is described where the communication condition deteriorates while the agent device is responding to a user and the reproduction of audio data is about to be interrupted. In the above-described case, the interactive agent system inserts a phrase into an appropriate silent section in the audio data as in the first embodiment or the second embodiment.

For example, the interactive agent system changes audio data "It is sunny today in Tokyo. It will rain tomorrow in Tokyo." into audio data "It is sunny today in Tokyo. Well, it will rain tomorrow in Tokyo.". As described above, the interactive agent system is able to insert a phrase into an appropriate silent section in audio data. This allows the interactive agent system to stably secure time for receiving audio data while preventing a user interacting with the agent device from feeling that the sounds are interrupted.

(8.1.2. Agent Device that Repeatedly Inserts Phrases)

The following describes an example in which the above-described agent device repeatedly inserts phrases. For example, the interactive agent device inserts an insertion phrase into the audio data "It is sunny today in Tokyo. It will rain tomorrow in Tokyo." to change the audio data into the audio data "It is sunny today in Tokyo. Well, it will rain tomorrow in Tokyo.". However, in a case where it is determined that it is still not possible to receive data in time in spite of an insertion phrase inserted into audio data once, the agent device may further insert an insertion phrase. For example, "Just a moment, please" may be further inserted after "well" to change the audio data into "It is sunny today in Tokyo. Well, just a moment, please. It will rain tomorrow in Tokyo.". As described above, the agent device is able to repeatedly insert insertion phrases. The agent device thus repeatedly inserts phrases, thereby making it possible to stably secure time for receiving audio data while preventing a user from feeling that the sounds are interrupted even if it is determined that the reproduction time is still insufficient in spite of a phrase inserted once.

(8.1.3. Audio News Reader that Aurally Reports Bad Communication Condition)

The following describes an example in which an embodiment of the present disclosure is applied to an audio news reader that reads news aloud and aurally outputs the news. In the present application example, the audio news reader corresponds to the client terminal 10. In addition, it is assumed that the audio news reader is coupled to a server having the same function as that of the server 30 via a network. It is to be noted that the audio news reader receives and reproduces audio data generated by the server to notify a user of news.

As a specific application example, a case is described where the communication condition deteriorates while the audio news reader is reproducing audio data and the reproduction of the audio data is about to be interrupted. In the above-described case, the audio news reader inserts a phrase into an appropriate silent section in the audio data as in the first embodiment and the second embodiment. Usually, the audio news reader inserts an interjection into audio data. However, in a case of the present application example, the audio news reader may insert a sound indicating that the reproduction of the sounds is interrupted. For example, the audio news reader may insert sounds "Audio reading is stopped because of a bad communication condition. Just a moment, please." at timing at which audio data is not received in time to notify a user of a bad communication condition. As described above, the audio news reader is able to insert a reason for the interrupted reproduction of audio data into the audio data. The audio news reader is thus able to notify a user of a reason for interrupted sounds to make the user less stressed about the interrupted sounds.

<8.2. Application Example of Third Embodiment and Fourth Embodiment>

The following describes an application example of the case described in the third embodiment and the fourth embodiment where a phrase is inserted at a phrasal delimitation in audio data.

(8.2.1. Agent Device that Inserts Interjection in accordance with Communication Condition)

The following describes an example in which the third embodiment or the fourth embodiment is applied to the above-described interactive agent system. As a specific application example, a case is described where the communication condition deteriorates while the agent device is responding to a user and the reproduction of audio data is about to be interrupted. In the above-described case, the interactive agent system inserts a phrase at an appropriate phrasal delimitation in the audio data as in the third embodiment or the fourth embodiment. It is to be noted that audio data have more phrasal delimitations than silent sections. Accordingly, in a case where the agent device inserts a phrase at a phrasal delimitation, it is possible to insert a phrase at a more natural position as compared with the case where a phrase is inserted into a silent section in (8.1.1. Agent Device that Inserts Interjection in accordance with Communication Condition). For example, the agent device is able to insert the interjection "well" at a phrasal delimitation in the audio data "It is sunny today in Tokyo." to change the audio data into audio data "It is, well, sunny today in Tokyo.". As described above, the interactive agent system is able to insert a phrase at an appropriate phrasal delimitation in audio data. This allows the interactive agent system to stably secure time for receiving audio data while preventing a user interacting with the agent device from feeling that the sounds are interrupted.

<8.3. Application Example of Fifth Embodiment>

The following describes an application example of the case described in the fifth embodiment where a phrase in audio data is replaced.

(8.3.1. Interactive Agent that Replaces Phrase in accordance with Communication Condition)

The following describes an example in which the fifth embodiment is applied to the above-described interactive agent system. As a specific application example, a case is described where the communication condition deteriorates while the agent device is responding to a user and the reproduction of audio data is about to be interrupted. In the above-described case, the interactive agent system replaces a phrase in audio data with another phrase as in the fifth embodiment. For example, the agent device replaces "there" in audio data "The nearest pharmacy is EEE Drugstore FFF Branch. It takes ten minutes to reach there." with "EEE Drugstore FFF Branch". The agent device then reproduces audio data "The nearest pharmacy is EEE Drugstore FFF Branch. It takes ten minutes to reach EEE Drugstore FFF Branch.". As described above, the interactive agent system is able to replace a phrase in audio data with another phrase. This allows the interactive agent system to stably secure time for receiving audio data while preventing a user interacting with the agent device from feeling that the sounds are interrupted.

<8.4. Conversation Example of User and Agent Device>

The following describes a specific conversation example for the agent device to read news aloud as a response to an input of a user. For example, when a user speaks "Tell me news, agent.", the agent device replies "Sure. What genre of news would you like?". When the user speaks "Economic news." next, the agent device replies "Certainly. This is the latest economic news." and reads news regarding economics aloud. When audio data does not seem to be received in time while the news is being read aloud, the agent device inserts a phrase into the audio data. The agent device then keeps reading the news aloud like "The eight major electrical manufacturers have announced financial results. The data are now being received. Just a moment, please. The financial result of GGG Company is . . . ". The agent device then inserts a phrase "The data are now being received." into the audio data, thereby making it possible to secure time for receiving audio data.

In addition, the following describes a specific conversation example for the agent device to read schedule aloud as a response to an input of a user. For example, when a user speaks "Tell me my schedule for tomorrow, agent.", the agent device reads the schedule aloud. When audio data does not seem to be received in time while schedule is being read aloud, the agent device inserts a phrase into the audio data. The agent device then replies "Certainly. You will have a meeting with III Company in HHH Building at 10 o'clock tomorrow, move to JJJ Building after that for a meeting at 13 o'clock, and, well, just a moment, please. After that, you will have dinner at 18 o'clock.". The agent device then inserts a phrase "Well, just a moment, please." into the audio data, thereby making it possible to secure time for receiving audio data.

The application examples of the information processing system according to an embodiment of the present disclosure have been described above. Next, a hardware configuration according to an embodiment of the present disclosure is described.

9. HARDWARE CONFIGURATION

The above-described information processing such as the phrase insertion process and the phrase replacement process of the information processing apparatus is achieved in cooperation between software and hardware of the client terminal 10 described below.

FIG. 19 is a block diagram illustrating a hardware configuration of the client terminal 10. The client terminal 10 includes CPU (Central Processing Unit) 101, ROM (Read Only Memory) 103, and RAM (Random Access Memory) 105. In addition, the client terminal 10 includes an input device 107, a display device 109, an audio output device 111, a storage device 113, and a communication device 115.

The CPU 101 functions as an arithmetic processing device and a control device, and controls the overall operation of the client terminal 10 in accordance with various programs. In addition, the CPU 101 may be a microprocessor. The ROM 103 stores programs, arithmetic parameters, and the like used by the CPU 101. The RAM 105 temporarily stores programs used in execution of the CPU 101, parameters appropriately changed in the execution, and the like. These are coupled to each other by a host bus including a CPU bus or the like. The CPU 101, the ROM 103, and the RAM 105 may achieve the function of the client terminal 10 described with reference to FIG. 2 in cooperation with software.

The input device 107 includes an input means such as a touch panel, a button, a camera, a microphone, a sensor, a switch, and a lever for a user to input information, an input control circuit that generates an input signal on the basis of the input from the user and outputs the input signal to the CPU 101, and the like. A user of the client terminal 10 operates the input device 107 to input various kinds of data to the client terminal 10 and issue an instruction about a processing operation.

The display device 109 includes, for example, a display unit such as a CRT (Cathode Ray Tube) display, a liquid crystal display (LCD), a projector, an organic light emitting diode (OLED) device, and a lamp. In addition, the audio output device 111 includes an audio output device such as a speaker and a headphone.

The storage device 113 is a device for data storage. The storage device 113 may include a storage medium, a recording device that records data in the storage medium, a readout device that reads out data from the storage medium, a deletion device that deletes data recoded in the storage medium, and the like. The storage device 113 includes, for example, HDD (Hard Disk Drive) or SSD (Solid Storage Drive). Alternatively, the storage device 113 includes, a memory or the like having the equivalent function. This storage device 113 drives a storage, and stores a program executed by the CPU 101 and various kinds of data.

The communication device 115 is a communication interface including a communication device or the like for coupling to the network 14, for example. Examples of the communication interface include a near field communication interface such as Bluetooth (registered trademark) or ZigBee (registered trademark), or a communication interface such as wireless LAN (Local Area Network), Wi-Fi (registered trademark), or a mobile communication network (LTE or 3G). In addition, the communication device 115 may be a wired communication device that performs wired communication.

The hardware configuration of the client terminal 10 has been described above with reference to FIG. 19.

10. CONCLUSION

As described above, the information processing apparatus according to the present disclosure is able to temporarily retain audio data received from the server via the network. In addition, on the basis of at least any of the state of retained audio data and the state of the network, the information processing apparatus is able to calculate the reproduction time of an insertion phrase to be inserted for reproduction into the audio data being reproduced. In addition, the information processing apparatus is able to decide an insertion position at which an insertion phrase is inserted into audio data, and insert an insertion phrase corresponding to a calculated reproduction time at the insertion position. As described above, it is possible to provide a novel and improved information processing apparatus, information processing method, and program each of which makes it possible to stably secure time for receiving audio data when reproducing audio data while receiving audio data.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

In addition, the series of processes by each device described herein may be achieved by using any of software, hardware, and the combination of software and hardware. A program included in the software is stored in advance, for example, in a recording medium (non-transitory medium: non-transitory media) provided inside or outside each device. Then, each program is read by RAM, for example, when executed by a computer, and is executed by a processor such as CPU.

In addition, the processes described by using the flowcharts and the sequence diagrams in this specification do not necessarily have to be executed in the illustrated order. Some of the processing steps may be executed in parallel. In addition, an additional processing step may be adopted, and some of the processing steps may be omitted.

In addition, the effects described herein are merely illustrative and exemplary, and not limitative. That is, the technology according to the present disclosure may exert other effects that are apparent to those skilled in the art from the description herein, in addition to the above-described effects or in place of the above-described effects.

It is to be noted that the following configurations also fall within the technical scope of the present disclosure.

(1)

An information processing apparatus including:

an audio buffer unit that retains first audio data that have not been reproduced in the first audio data received from another apparatus via a transmission path;

a reproduction time calculation unit that calculates a reproduction time of second audio data on the basis of at least any of a state of the first audio data retained in the audio buffer unit or a state of the transmission path, the second audio data being to be inserted and reproduced while the first audio data are being reproduced;

a position decision unit that decides an insertion position of the second audio data in the first audio data; and an insertion unit that controls a process of inserting the second audio data at the insertion position in the first audio data, the insertion position being decided by the position decision unit, the second audio data corresponding to the reproduction time calculated by the reproduction time calculation unit.

(2)
The information processing apparatus according to (1), in which the position decision unit decides a silent section as the insertion position.
(3)
The information processing apparatus according to (2), further including a silent section detection unit that detects the silent section included in the first audio data.
(4)
The information processing apparatus according to (1), in which the position decision unit decides the insertion position on the basis of sentence information.
(5)
The information processing apparatus according to (4), further including a sentence analysis unit that acquires the sentence information of the first audio data.
(6)
The information processing apparatus according to (5), in which
the position decision unit decides a phrasal delimitation as the insertion position on the basis of the sentence information, the phrasal delimitation being included in the first audio data, and
the insertion unit inserts the second audio data at the insertion position.
(7)
The information processing apparatus according to (5), in which
the position decision unit decides a phrase as the insertion position on the basis of the sentence information, the phrase being included in the first audio data, and
the insertion unit deletes the phrase decided as the insertion position, and inserts the second audio data instead of the deleted phrase.
(8)
The information processing apparatus according to (7), in which the second audio data include the first audio data in past.
(9)
The information processing apparatus according to (8), in which the second audio data include the first audio data in the past, the first audio data including a phrase having a meaning similar to a meaning of a phrase to be deleted, and having a longer reproduction time than a reproduction time of the phrase to be deleted.
(10)
The information processing apparatus according to any one of (1) to (9), further including a determination unit that determines whether to insert the second audio data into the first audio data or not, in which
the determination unit determines whether to insert the second audio data into the first audio data or not, in accordance with whether or not the reproduction time satisfies a predetermined condition.
(11)
The information processing apparatus according to (1), in which, in a case where the position decision unit fails to decide the insertion position, the position decision unit switches a method of deciding the insertion position of the second audio data.
(12)
The information processing apparatus according to (11), in which, in a case where the position decision unit fails to decide a silent section as the insertion position, the position decision unit switches a method of deciding the silent section as the insertion position to a method of deciding a phrasal delimitation as the insertion position.

(13)
The information processing apparatus according to (1), in which the state of the first audio data retained in the audio buffer unit includes at least any of an amount of the first audio data retained in the audio buffer unit or an increase or decrease amount.
(14)
The information processing apparatus according to any one of (1) to (11), further including a storage unit that stores the second audio data to be inserted into the first audio data by the insertion unit.
(15)
An information processing method that is executed by a processor, the information processing method including:
retaining first audio data that have not been reproduced in the first audio data received from another apparatus via a transmission path;
calculating a reproduction time of second audio data on the basis of at least any of a state of the first audio data retained in an audio buffer unit or a state of the transmission path, the second audio data being to be inserted and reproduced while the first audio data are being reproduced;
deciding an insertion position of the second audio data in the first audio data; and
controlling a process of inserting the second audio data at the insertion position in the first audio data, the insertion position being decided by a position decision unit, the second audio data corresponding to the reproduction time calculated by a reproduction time calculation unit.
(16)
A program for causing a computer to function as
an audio buffer unit that retains first audio data that have not been reproduced in the first audio data received from another apparatus via a transmission path,
a reproduction time calculation unit that calculates a reproduction time of second audio data on the basis of at least any of a state of the first audio data retained in the audio buffer unit or a state of the transmission path, the second audio data being to be inserted and reproduced while the first audio data are being reproduced,
a position decision unit that decides an insertion position of the second audio data in the first audio data, and
an insertion unit that controls a process of inserting the second audio data at the insertion position in the first audio data, the insertion position being decided by the position decision unit, the second audio data corresponding to the reproduction time calculated by the reproduction time calculation unit.

REFERENCE SIGNS LIST 10 client terminal
14 network
30 server
121 communication unit
122 communication unit
123 communication unit
124 communication unit
125 communication unit
126 audio buffer unit
128 reproduction time decision unit
132 silent section detection unit
136 storage unit
140 phrase insertion unit
144 audio data reproduction unit
152 sentence analysis unit
160 audio data saving unit 164 phrase replacement unit
221 communication unit
226 audio buffer unit
244 audio data reproduction unit
321 communication unit
322 communication unit
323 communication unit
324 communication unit
325 communication unit
332 silent section detection unit
348 audio data generation unit
352 sentence analysis unit
356 sentence data generation unit

The invention claimed is:

1. An information processing apparatus, comprising:
an audio buffer unit that retains first audio data that have not been reproduced in the first audio data received from another apparatus via a transmission path;
a reproduction time calculation unit that calculates a reproduction time of second audio data on a basis of at least any of a state of the first audio data retained in the audio buffer unit or a state of the transmission path, the second audio data being to be inserted and reproduced while the first audio data are being reproduced;
a position decision unit that decides an insertion position of the second audio data in the first audio data; and
an insertion unit that controls a process of inserting the second audio data at the insertion position in the first audio data, the insertion position being decided by the position decision unit, the second audio data corresponding to the reproduction time calculated by the reproduction time calculation unit.

2. The information processing apparatus according to claim 1, wherein the position decision unit decides a silent section as the insertion position.

3. The information processing apparatus according to claim 2, further comprising a silent section detection unit that detects the silent section included in the first audio data.

4. The information processing apparatus according to claim 1, wherein the position decision unit decides the insertion position on a basis of sentence information.

5. The information processing apparatus according to claim 4, further comprising a sentence analysis unit that acquires the sentence information of the first audio data.

6. The information processing apparatus according to claim 5, wherein
the position decision unit decides a phrasal delimitation as the insertion position on the basis of the sentence information, the phrasal delimitation being included in the first audio data, and
the insertion unit inserts the second audio data at the insertion position.

7. The information processing apparatus according to claim 5, wherein
the position decision unit decides a phrase as the insertion position on the basis of the sentence information, the phrase being included in the first audio data, and
the insertion unit deletes the phrase decided as the insertion position, and inserts the second audio data instead of the deleted phrase.

8. The information processing apparatus according to claim 7, wherein the second audio data includes the first audio data retained in the audio buffer unit.

9. The information processing apparatus according to claim 8, wherein the first audio data includes a phrase having a meaning similar to a meaning of the phrase to be deleted, and having a longer reproduction time than a reproduction time of the phrase to be deleted.

10. The information processing apparatus according to claim 1, further comprising a determination unit that determines whether to insert the second audio data into the first audio data or not, wherein
the determination unit determines whether to insert the second audio data into the first audio data or not, in accordance with whether or not the reproduction time satisfies a predetermined condition.

11. The information processing apparatus according to claim 1, wherein, in a case where the position decision unit fails to decide the insertion position, the position decision unit switches a method of deciding the insertion position of the second audio data.

12. The information processing apparatus according to claim 11, wherein, in a case where the position decision unit fails to decide a silent section as the insertion position, the position decision unit switches a method of deciding the silent section as the insertion position to a method of deciding a phrasal delimitation as the insertion position.

13. The information processing apparatus according to claim 1, wherein the state of the first audio data retained in the audio buffer unit includes at least any of an amount of the first audio data retained in the audio buffer unit or an increase or decrease amount.

14. The information processing apparatus according to claim 1, further comprising a storage unit that stores the second audio data to be inserted into the first audio data by the insertion unit.

15. An information processing method that is executed by a processor, the information processing method comprising:
retaining first audio data that have not been reproduced in the first audio data received from another apparatus via a transmission path;
calculating a reproduction time of second audio data on a basis of at least any of a state of the first audio data retained in an audio buffer unit or a state of the transmission path, the second audio data being to be inserted and reproduced while the first audio data are being reproduced;
deciding an insertion position of the second audio data in the first audio data; and
controlling a process of inserting the second audio data at the insertion position in the first audio data, the insertion position being decided by a position decision unit, the second audio data corresponding to the reproduction time calculated by a reproduction time calculation unit.

16. A non-transitory computer-readable medium having stored thereon, computer-executable instructions which, when executed by a computer, cause the computer to execute operations, the operations comprising:
an audio buffer unit that retains first audio data that have not been reproduced in the first audio data received from another apparatus via a transmission path,
a reproduction time calculation unit that calculates a reproduction time of second audio data on a basis of at least any of a state of the first audio data retained in the audio buffer unit or a state of the transmission path, the second audio data being to be inserted and reproduced while the first audio data are being reproduced,
a position decision unit that decides an insertion position of the second audio data in the first audio data, and
an insertion unit that controls a process of inserting the second audio data at the insertion position in the first audio data, the insertion position being decided by the position decision unit, the second audio data corresponding to the reproduction time calculated by the reproduction time calculation unit.

\* \* \* \* \*